US008583156B2

(12) United States Patent
Niwano

(10) Patent No.: US 8,583,156 B2
(45) Date of Patent: Nov. 12, 2013

(54) MOBILE STATION, BASE STATION, COMMUNICATION SYSTEM, AMOUNT-OF-DATA INFORMATION TRANSMISSION METHOD, TRANSMISSION-CONTROL-INFORMATION NOTIFICATION METHOD, AND WIRELESS COMMUNICATION METHOD

(75) Inventor: Kazuhito Niwano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 886 days.

(21) Appl. No.: 10/589,974

(22) PCT Filed: Apr. 30, 2004

(86) PCT No.: PCT/JP2004/006272
§ 371 (c)(1),
(2), (4) Date: Aug. 18, 2006

(87) PCT Pub. No.: WO2005/107311
PCT Pub. Date: Nov. 10, 2005

(65) Prior Publication Data
US 2008/0212524 A1    Sep. 4, 2008

(51) Int. Cl.
*H04B 7/00* (2006.01)
(52) U.S. Cl.
USPC ............ 455/509; 455/522; 455/69; 455/450; 455/67.11; 370/329; 370/335
(58) Field of Classification Search
USPC ................ 370/329, 331, 338; 455/436, 509, 455/450–452.2, 513, 522, 69, 67.11–67.16
See application file for complete search history.

(56) References Cited

U.S. PATENT DOCUMENTS

| 4,573,207 | A | * | 2/1986 | Smith et al. | 455/509 |
| 4,972,506 | A | * | 11/1990 | Uddenfeldt | 370/337 |
| 5,648,967 | A | * | 7/1997 | Schulz | 370/328 |
| 5,655,217 | A | * | 8/1997 | Lemson | 455/513 |
| 5,745,842 | A | * | 4/1998 | Priest | 455/69 |
| 5,757,772 | A | * | 5/1998 | Thornberg et al. | 370/236 |
| 5,768,684 | A | * | 6/1998 | Grubb et al. | 455/13.4 |
| 5,991,313 | A | * | 11/1999 | Tanaka et al. | 370/537 |

(Continued)

FOREIGN PATENT DOCUMENTS

| JP | 09-233051 | 9/1997 |
| JP | 11-513868 | 11/1999 |

(Continued)

OTHER PUBLICATIONS

R1-030067: "AH64: Reducing control channel overhead for Enhanced Uplink", Motorola, Jan. 7-11, 2003, San Diego, U.S.A., Fig.1.

(Continued)

*Primary Examiner* — Sharad Rampuria
(74) *Attorney, Agent, or Firm* — Oblon, Spivak, McClelland, Maier & Neustadt, L.L.P.

(57) ABSTRACT

A mobile station includes an amount-of-data information determining means for monitoring data which are stored on a communication-service-by-communication-service basis or on a transmit-channel-by-transmit-channel so as to determine communication-service-by-communication-service or transmit-channel-by-transmit-channel amount-of-data information. The mobile station transmits the communication-service-by-communication-service or transmit-channel-by-transmit-channel amount-of-data information determined by the amount-of-data information determining means to a base station.

17 Claims, 26 Drawing Sheets

(56) References Cited

U.S. PATENT DOCUMENTS

| | | | |
|---|---|---|---|
| 6,031,832 A * | 2/2000 | Turina | 370/348 |
| 6,035,197 A * | 3/2000 | Haberman et al. | 455/439 |
| 6,088,600 A * | 7/2000 | Rasmussen | 455/574 |
| 6,307,864 B1 * | 10/2001 | Fensch et al. | 370/465 |
| 6,388,993 B1 | 5/2002 | Shin et al. | |
| 6,414,943 B1 * | 7/2002 | Hwang et al. | 370/310 |
| 6,519,469 B1 * | 2/2003 | Rydnell et al. | 455/466 |
| 6,542,481 B2 * | 4/2003 | Foore et al. | 370/329 |
| 6,594,241 B1 * | 7/2003 | Malmlof | 370/329 |
| RE39,375 E * | 11/2006 | Hamalainen et al. | 370/322 |
| 8,027,698 B2 * | 9/2011 | Niwano et al. | 455/522 |
| 2002/0024936 A1 * | 2/2002 | Yamamoto | 370/252 |
| 2002/0159411 A1 | 10/2002 | Airy et al. | |
| 2004/0184417 A1 * | 9/2004 | Chen et al. | 370/328 |
| 2007/0037572 A1 * | 2/2007 | Nanba | 455/426.2 |
| 2007/0224989 A1 * | 9/2007 | Soong et al. | 455/436 |

FOREIGN PATENT DOCUMENTS

| | | |
|---|---|---|
| JP | 2000-069040 | 3/2000 |
| JP | 2000-069548 | 3/2000 |
| JP | 2002-368802 | 12/2002 |
| JP | 2003-046482 | 2/2003 |
| JP | 2003-163667 | 6/2003 |
| JP | 2003-304195 | 10/2003 |
| JP | 2004-072294 | 3/2004 |
| JP | 2004-245851 | 9/2004 |
| JP | 2009-261035 | 11/2009 |
| JP | 2010-273371 | 12/2010 |
| WO | WO 02/01760 A1 | 1/2002 |
| WO | WO 2005/107311 A1 | 11/2005 |

OTHER PUBLICATIONS

R1-031056: "Uplink signaling of scheduling information", Samsung, Oct. 6-10, 2003, Seoul, Korea, Fig. 1-3.

Nokia: "Uplink Signalling for Node B Scheduling", $3^{rd}$ Generation Partnership Project (3GPP), Mobile Competence Centre, vol. RAN WG1, XP050111987, Jan. 23, 2004, 6 pages.

$3^{rd}$ Generation Partnership Project: Technical Specification Group Radio Access Network; Feasibility Study for Enhanced Uplink for ULTRA FDD (Release 6), 3 GPP Standard; 3rd Generation Partnership Project (3GPP), Mobile Competence Centre, No. V6.0.0, XP050369310, Mar. 1, 2004, pp. 1-179.

NEC: "Consideration of Provision of Guaranteed Bit Rate Service in Enhanced Uplink", 3GPP Draft; R1-031322, 3rd Generation Partnership Project (3GPP), Mobile Competence Centre,vol. RAM WG1, XP050098373, Nov. 19, 2003, XP050098373, 3 pages.

Office Action issued Oct. 5, 2010 in JP Application No. 2010-162873 (With English Translation).

Office Action issued Jun. 7, 2011, in Japanese Patent Application No. 2010-269330 (with English-language translation).

Office Action mailed Feb. 21, 2012, in Japanese Application No. 2010-269330 (with English-language translation).

Office Action mailed Feb. 28, 2012, in Japanese Application No. 2011-169350 (with English-language translation).

Extended European Search Report Issued Apr. 10, 2013 in Patent Application No. 12174711.7.

"$3^{rd}$ Generation Partnership Project; Technical Specification Group Radio Access Network; US Radio Access capabilities (Release 4)", 3GPP TS 25.306, XP050367459, vol. 4.9.0, Dec. 2003, pp. 1-23.

* cited by examiner

FIG.12A

| Index | Service 1 | Service 2 |
|---|---|---|
| 1 | Occupation ratio 100% | 100% |
| 2 | 100% | 80% |
| 3 | 80% | 100% |
| 4 | 80% | 80% |
| ⋮ | ⋮ | ⋮ |
| 10 | 0% | 0% |

FIG.12B

| Index | DTCH1 | DTCH2 |
|---|---|---|
| 1 | Occupation ratio 100% | 100% |
| 2 | 100% | 80% |
| 3 | 80% | 100% |
| 4 | 80% | 80% |
| ⋮ | ⋮ | ⋮ |
| 10 | 0% | 0% |

FIG.15A

| Index | Service 1 | Service 2 |
|---|---|---|
| 1 | 100sec | 100sec |
| 2 | 100sec | 80sec |
| 3 | 80sec | 100sec |
| 4 | 80sec | 80sec |
| ⋮ | ⋮ | ⋮ |
| 10 | 0sec | 0sec |

FIG.15B

| Index | DTCH1 | DTCH2 |
|---|---|---|
| 1 | 100sec | 100sec |
| 2 | 100sec | 80sec |
| 3 | 80sec | 100sec |
| 4 | 80sec | 80sec |
| ⋮ | ⋮ | ⋮ |
| 10 | 0sec | 0sec |

FIG.16

| Traffic class | Conversational class | Streaming class | Interactive class | Background class |
|---|---|---|---|---|
| Maximum bitrate(kbps) | $<=16000(2)$ | $<=16000(2)$ | $<=16000-$overhead$(2)(3)$ | $<=16000-$overhead$(2)(3)$ |
| Delivery order | Yes/No | Yes/No | Yes/No | Yes/No |
| Maximum SDU size(octets) | $<=1500$ or $1502(4)$ | $<=1500$ or $1502(4)$ | $<=1500$ or $1502(4)$ | $<=1500$ or $1502(4)$ |
| SDU format information | (5) | (5) | | |
| Delivery of erroneous SDUs | Yes/No/-(6) | Yes/No/-(6) | Yes/No/-(6) | Yes/No/-(6) |
| Residual BER | $5*10^{-2}, 10^{-2}, 5*10^{-3}, 10^{-3},$ $10^{-4}, 10^{-5}, 10^{-6}$ | $5*10^{-2}, 10^{-2}, 5*10^{-3}, 10^{-3},$ $10^{-4}, 10^{-5}, 10^{-6}$ | $4*10^{-3}, 10^{-5}, 6*10^{-8}(7)$ | $4*10^{-3}, 10^{-5}, 6*10^{-8}(7)$ |
| SDU error ratio | $10^{-2}, 7*10^{-3}, 10^{-3}, 10^{-4}, 10^{-5}$ | $10^{-1}, 10^{-2}, 7*10^{-3}, 10^{-3}, 10^{-4}, 10^{-5}$ | $10^{-3}, 10^{-4}, 10^{-6}$ | $10^{-3}, 10^{-4}, 10^{-6}$ |
| Transfer delay(ms) | 100-maximum value | 280(8)-maximum value | | |
| Guaranteed bit rate(kbps) | $<=16000(2)$ | $<=16000(2)$ | $<=16000(2)$ | $<=16000(2)$ |
| Traffic handling priority | | | 1,2,3(9) | |
| Allocation/Retention priority | 1,2,3 | 1,2,3 | 1,2,3 | 1,2,3 |
| Source statistic descriptor | Speech/unknown | Speech/unknown | | |
| Signalling Indication | | | Yes,No(9) | |

FIG.18A

| Index | Service 1 | Service 2 |
|---|---|---|
| 1 | 100TTI | 100TTI |
| 2 | 100TTI | 80TTI |
| 3 | 80TTI | 100TTI |
| 4 | 80TTI | 80TTI |
| ⋮ | ⋮ | ⋮ |
| 10 | 0TTI | 0TTI |

FIG.18B

| Index | DTCH1 | DTCH2 |
|---|---|---|
| 1 | 100TTI | 100TTI |
| 2 | 100TTI | 80TTI |
| 3 | 80TTI | 100TTI |
| 4 | 80TTI | 80TTI |
| ⋮ | ⋮ | ⋮ |
| 10 | 0TTI | 0TTI |

FIG.19A

| Index | Service 1 | Service 2 |
|---|---|---|
| 1 | 100bps | 100bps |
| 2 | 100bps | 80bps |
| 3 | 80bps | 100bps |
| 4 | 80bps | 80bps |
| ⋮ | ⋮ | ⋮ |
| 10 | 0bps | 0bps |

FIG.19B

| Index | DTCH1 | DTCH2 |
|---|---|---|
| 1 | 100bps | 100bps |
| 2 | 100bps | 80bps |
| 3 | 80bps | 100bps |
| 4 | 80bps | 80bps |
| ⋮ | ⋮ | ⋮ |
| 10 | 0bps | 0bps |

FIG.20

| Traffic class | Conversational class | Streaming class | Interactive class | Background class |
|---|---|---|---|---|
| Maximum bitrate(kbps) | <=16000(2) | <=16000(2) | <=16000-overhead(2)(3) | <=16000-overhead(2)(3) |
| Delivery order | Yes/No | Yes/No | Yes/No | Yes/No |
| Maximum SDU size(octets) | <=1500 or 1502(4) | <=1500 or 1502(4) | <=1500 or 1502(4) | <=1500 or 1502(4) |
| SDU format information | (5) | (5) | | |
| Delivery of erroneous SDUs | Yes/No/-(6) | Yes/No/-(6) | Yes/No/-(6) | Yes/No/-(6) |
| Residual BER | $5*10^{-2}, 10^{-2}, 5*10^{-3}, 10^{-3}, 10^{-4}, 10^{-5}, 10^{-6}$ | $5*10^{-2}, 10^{-2}, 5*10^{-3}, 10^{-3}, 10^{-4}, 10^{-5}, 10^{-6}$ | $4*10^{-3}, 10^{-5}, 6*10^{-8}(7)$ | $4*10^{-3}, 10^{-5}, 6*10^{-8}(7)$ |
| SDU error ratio | $10^{-2}, 7*10^{-3}, 10^{-3}, 10^{-4}, 10^{-5}$ | $10^{-1}, 10^{-2}, 7*10^{-3}, 10^{-3}, 10^{-4}, 10^{-5}$ | $10^{-3}, 10^{-4}, 10^{-6}$ | $10^{-3}, 10^{-4}, 10^{-6}$ |
| Transfer delay(ms) | 100-maximum value | 280(8)-maximum value | 500-maximum value | 2000-maximum value |
| Guaranteed bit rate(kbps) | <=16000(2) | <=16000(2) | | |
| Traffic handling priority | | | 1,2,3(9) | |
| Allocation/Retention priority | 1,2,3 | 1,2,3 | 1,2,3 | 1,2,3 |
| Source statistic descriptor | Speech/unknown | Speech/unknown | | |
| Signalling Indication | | | Yes,No(9) | |

FIG.21

| TFR Index (TFCI) | E-DCH |
|---|---|
| 11 | 1000 |
| 10 | 1000 |
| ⋮ | ⋮ |
| 7 | 100 |
| 6 | 80 |
| 5 | 20 |
| 4 | 20 |
| ⋮ | ⋮ |
| 0 | 0 |

Enhanced TFC specification values (rows 10–11 and above)
Conventional TFC specification values (rows 0–7)

(Unit : bit/TTI)

FIG.22

| TFR Index (TFCI) | E-DCH | DCH |
|---|---|---|
| 11 | 1000 | 1000 |
| 10 | 1000 | 800 |
| ⋮ | ⋮ | ⋮ |
| 7 | 100 | 100 |
| 6 | 80 | 40 |
| 5 | 20 | 40 |
| 4 | 20 | 20 |
| ⋮ | ⋮ | ⋮ |
| 0 | 0 | 0 |

(Unit : bit/TTI, bit/subframe, bit/slot , etc.)

FIG.23

| Gain factor Index | E-DCH ($\beta$ eu) |
|---|---|
| 11 | 30 |
| 10 | 30 |
| ⋮ | ⋮ |
| 7 | 20 |
| 6 | 10 |
| 5 | 5 |
| 4 | 5 |
| ⋮ | ⋮ |
| 0 | 0 |

FIG.25

| Gain factor Index | E-DCH (Power Offset:dB) |
|---|---|
| 11 | 20 |
| 10 | 10 |
| ⋮ | ⋮ |
| 7 | 8 |
| 6 | 6 |
| 5 | 5 |
| 4 | 4 |
| ⋮ | ⋮ |
| 0 | 0 |

MOBILE STATION, BASE STATION, COMMUNICATION SYSTEM, AMOUNT-OF-DATA INFORMATION TRANSMISSION METHOD, TRANSMISSION-CONTROL-INFORMATION NOTIFICATION METHOD, AND WIRELESS COMMUNICATION METHOD

FIELD OF THE INVENTION

The present invention relates to a mobile station for, a base station for, a communication system for communicating packet data, an amount-of-data information transmission method, a transmission-control-information notification method, and a wireless communication method.

BACKGROUND OF THE INVENTION

In recent years, telecommunications standards called third generation are adopted as IMT-2000 by the International Telecommunications Union (ITU) for high-speed CDMA (Code Division Multiple Access: code division multiple access) mobile telecommunications methods. For W-CDMA (FDD: Frequency Division Duplex), commercial services were started in Japan in 2001.

W-CDMA systems are originally aimed at providing a maximum transmission rate of about 2 Mbps (Mega bit per sec) per mobile station. For W-CDMA systems, the standardization organization 3GPP (3rd Generation Partnership) determined the first specifications to summarize them as the release 1999th edition (Version name: 3.x.x) in 1999.

Various written standards of the above-mentioned release (including the subsequent releases) are disclosed on the Internet, as follows, and the contents of the various written standards have been updated. Currently, release 4 and release 5 are specified as other new versions of the release 1999th edition, and release 6 is being created.
URL: http://www.3gpp.org/ftp/Specs/archive/

In the above-mentioned written standards, it is specified that "In transmission of data from a mobile station to a base station, even when burst (Burst) transmission, such as transmission of packet data, is carried out, a radio resource is always secured, as a dedicated channel (DCH: Delicated CHannel), for each mobile station." For this reason, from the viewpoint of effective use of radio resources, useless securing of radio resources occurs.

Furthermore, since transmission of data from a mobile station to a base station is subject to autonomous transmission control (Autonomous Transmission) by the mobile station, transmission timing of each mobile station is arbitrary (random). In a CDMA communication system, since all transmission from other mobile stations serves as a source of interference, the amount of interference noises and the amount of change in the interference noise amount at the time when the base station receives data from the station can only be statistically expected.

For this reason, in the management of radio resources for the communication system, it is necessary to reduce the throughput (i.e., the maximum transmission rate of each mobile station) assuming a case where the amount of change is large, and to secure a radio resource which provides an interference margin of the base station.

Actually, control of assignment of radio resources for mobile station transmission, which is specified in the standard of W-CDMA systems, is not carried out by the base station, but is carried out by a base station controller (RNC: Radio Network Controller) which organizes base stations.

Since the control of assignment of radio resources which the base station controller carries out for each mobile station, and exchange of setup information between the base station controller and each mobile station need a relatively long processing time (of the order of several 100 msec), the base station controller cannot carry out the control of assignment of radio resources at a high speed while monitoring changes in the radio propagation environment and the transmission status of other mobile stations (e.g., the amount of interference from other mobile stations).

Then, there has been provided a method of improving the precision of the control of assignment of radio resources, which is associated with transmission of data from mobile stations, by additionally providing a function of assigning radio resources to the base station on the basis of the specifications of the above-mentioned written standard.

In FIG. 1 of R1-030067 ("AH64: Reducing control channel overhead for Enhanced Uplink", which is referred to as nonpatent reference 1 from here on), which is a document newly proposed as uplink performance enhancement/expansion (E-DCH: Enhancement of Dedicated CHannel), an on-demand channel assignment method for uplinks is disclosed.

This document is published on the Internet as follows.
URL:http://www.3gpp.org/ftp/tsg_ran/WG1_RL1/TSGR1_30/Docs/Zips/R1-030067.zip>[retrieved on Jan. 7, 2004]

In FIG. 1 of the above-mentioned nonpatent reference, a mobile station (UE: User Equipment) having packets to be transmitted transmits a request for permission to transmit packet data to a base station (Node-B) by using a channel for transmission request (USICCH: Uplink Scheduling Information Control Channel) including amount-of-data information about yet-to-be-transmitted packet data (Queue size).

When receiving the request for permission to transmit packet data from the mobile station, the base station transmits a result (i.e., scheduling result) of the assignment of radio resources, which indicating the assignment of transmission timing to the mobile station and so on, by using a downlink channel for assignment (DSACCH: Downlink Scheduling Assignment Control Channel).

When receiving the scheduling result from the base station, the mobile station sends out packet data onto a channel for data transmission (EUDCH: Enhanced Uplink Dedicated Transport Channel) to transmit them to the base station.

In this case, the mobile station separately transmits information, including a modulation method at the time of the transmission of packet data to the base station, to the base station by using a type-of-modulation information channel (UTCCH: Uplink TFRI Control Channel).

When receiving the packet data from the mobile station, the base station sends out information about a result of determination of the reception of the packet data (i.e., so-called ACK/NACK) onto a channel for notification (DANCCH: Downlink Ack/Nack Control Channel) to transmit it to the mobile station.

Although it can be assumed that these channels are an extension of conventional standard channels, or new channels which are introduced into the system, the details of the channels have not proposed yet.

A technology for notifying amount-of-data information from a mobile station to a base station is also disclosed by patent reference 1 (JP,2003-46482,A).

In the conventional standards of W-CDMA systems, although information about the amount of yet-to-be-transmitted data transmitted from a mobile station is temporarily received by a base station, the information about the amount of yet-to-be-transmitted data passes through the base station and is then transmitted to a base station controller juts as it is. For this reason, the base station cannot grasp the contents of the information about the amount of yet-to-be-transmitted data. Therefore, the base station cannot carry out the control of radio resources, unlike that as disclosed in above-mentioned nonpatent reference 1.

Even when it is possible to provide a means for temporarily transmitting information which the base station controller has acquired to the base station, the base station cannot carry out the control of radio resources at a high speed since the period of transmission of the amount information about yet-to-be-transmitted data from the mobile station to the base station controller is a long one (e.g., 250 ms, 500 ms, . . . , or 6000 ms).

A proposal about transmission timing of a notification of amount-of-data information about yet-to-be-transmitted data, which relates to the on-demand channel assignment method disclosed in above-mentioned nonpatent reference 1, is disclosed in R1-031056 ("Uplink signalling of scheduling information", which is referred to as nonpatent reference 2 from here on). In this proposal, various types of transmission methods, such as a periodic transmission method, are provided.

This document is published on the Internet as follows.
URL:http://www.3gpp.org/ftp/tsg_ran/WG1_RL1/TSGR1_34/Docs/Zips/R1-030056.zip>[retrieved on Jan. 7, 2004]

However, in W-CDMA systems, since one mobile station can carry out two or more communication services simultaneously, data having different priorities and demands for different delay times (i.e., different levels of so-called QoS: Quality of Service) coexist in the mobile station. Therefore, in the above-mentioned references, since such a case is not taken into consideration, it can be assumed that information about the total amount of data is only notified to the base station.

A problem with related art communication systems constructed as mentioned above is that even if information about the total amount of data is notified to the base station, the base station cannot grasp the amount of data on a communication-service-by-communication-service or transmit-channel-by-transmit-channel, and therefore cannot properly control the transmission timing of data on a communication-service-by-communication-service or transmit-channel-by-transmit-channel.

The present invention is made in order to solve the above-mentioned problem, and it is therefore an object of the present invention to provide a base station, a communication system, a transmission-control-information notification method, and a wireless communication method which can properly control the transmission timing of data on a communication-service-by-communication-service or transmit-channel-by-transmit-channel.

It is another object of the present invention to provide a mobile station and an amount-of-data information transmission method which enable a base station to properly control the transmission timing of data on a communication-service-by-communication-service or transmit-channel-by-transmit-channel.

DISCLOSURE OF THE INVENTION

A mobile station in accordance with the present invention includes an amount-of-data information determining means for monitoring data which are stored in the mobile station on a communication-service-by-communication-service basis or on a transmit-channel-by-transmit-channel basis so as to determine communication-service-by-communication-service or transmit-channel-by-transmit-channel amount-of-data information. The mobile station transmits the communication-service-by-communication-service or transmit-channel-by-transmit-channel amount-of-data information determined by the amount-of-data information determining means to a base station.

As a result, the base station can properly control the transmission timing of data which are stored in the mobile station on a communication-service-by-communication-service basis or on a transmit-channel-by-transmit-channel basis.

BRIEF DESCRIPTION OF THE FIGURES

FIG. 12A is a diagram showing an example of data occupation ratios of buffers according to services, and indexes each indicating a combination of the data occupation ratios according to services, and FIG. 12B is a diagram showing an example of the data occupation ratios of the transmit buffers of the radio link control unit, and indexes each indicating a combination of the data occupation ratios of the transmit buffers;

FIG. 15A is an explanatory diagram showing an example of amount-of-data information about the amount of data of the buffers which is calculated on a communication-service-by-communication-service basis, and indexes each of which is provided for a combination of two pieces of amount-of-data information, and FIG. 15B is an explanatory diagram showing an example of amount-of-data information which is calculated for each of the transmit buffers of the radio link control unit, and indexes each of which is provided for a combination of two pieces of amount-of-data information;

FIG. 16 is an explanatory diagram showing quality of service (QoS: Quality of Service) which is obtained for each type (Class) of communication service in order to allow a notification of the amount-of-data information about the amount of data in the form of "amount-of-data/guaranteed-bit-rate" (unit: sec);

FIG. 18A is an explanatory diagram showing an example of amount-of-data information about the amount of data of the buffers which is obtained on a communication-service-by-communication-service basis, and indexes each of which is provided for a combination of two pieces of amount-of-data information, and FIG. 18B is an explanatory diagram showing an example of amount-of-data information which is obtained for each of the transmit buffers of the radio link control unit, and indexes each of which is provided for a combination of two pieces of amount-of-data information;

FIG. 19A is an explanatory diagram showing an example of amount-of-data information about the amount of data of the buffers which is obtained on a communication-service-by-communication-service basis, and indexes each of which is provided for a combination of two pieces of amount-of-data information, and FIG. 19B is an explanatory diagram showing an example of amount-of-data information which is obtained for each of the transmit buffers of the radio link control unit, and indexes each of which is provided for a combination of two pieces of amount-of-data information;

FIG. 20 is an explanatory diagram showing quality of service (QoS: Quality of Service) which is provided for each type (Class) of communication service in order to enable a notification of the amount of data in the form of "amount-of-data/delay" (unit: bit per sec);

FIG. 21 is an explanatory diagram showing an example of a transmission rate of E-DCH as the amount-of-data information (TRbuffer), and an index (TFCI) of the transmission rate;

FIG. 22 is an explanatory diagram showing an example of the transmission rate of the E-DCH as the amount-of-data information (TRbuffer), and the index (TFCI) of the transmission rate;

FIG. 23 is an explanatory diagram showing an example of a setting of a channel amplitude coefficient (β) of DPDCH, as the amount-of-data information (TRbuffer), at a time when E-DCH data is transmitted, and an index of the channel amplitude coefficient;

FIG. 25 is an explanatory diagram showing an example of a setting of a transmission physical channel power offset, as the amount-of-data information (TRbuffer), at a time when E-DCH data is transmitted, and an index of the transmission physical channel power offset;

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
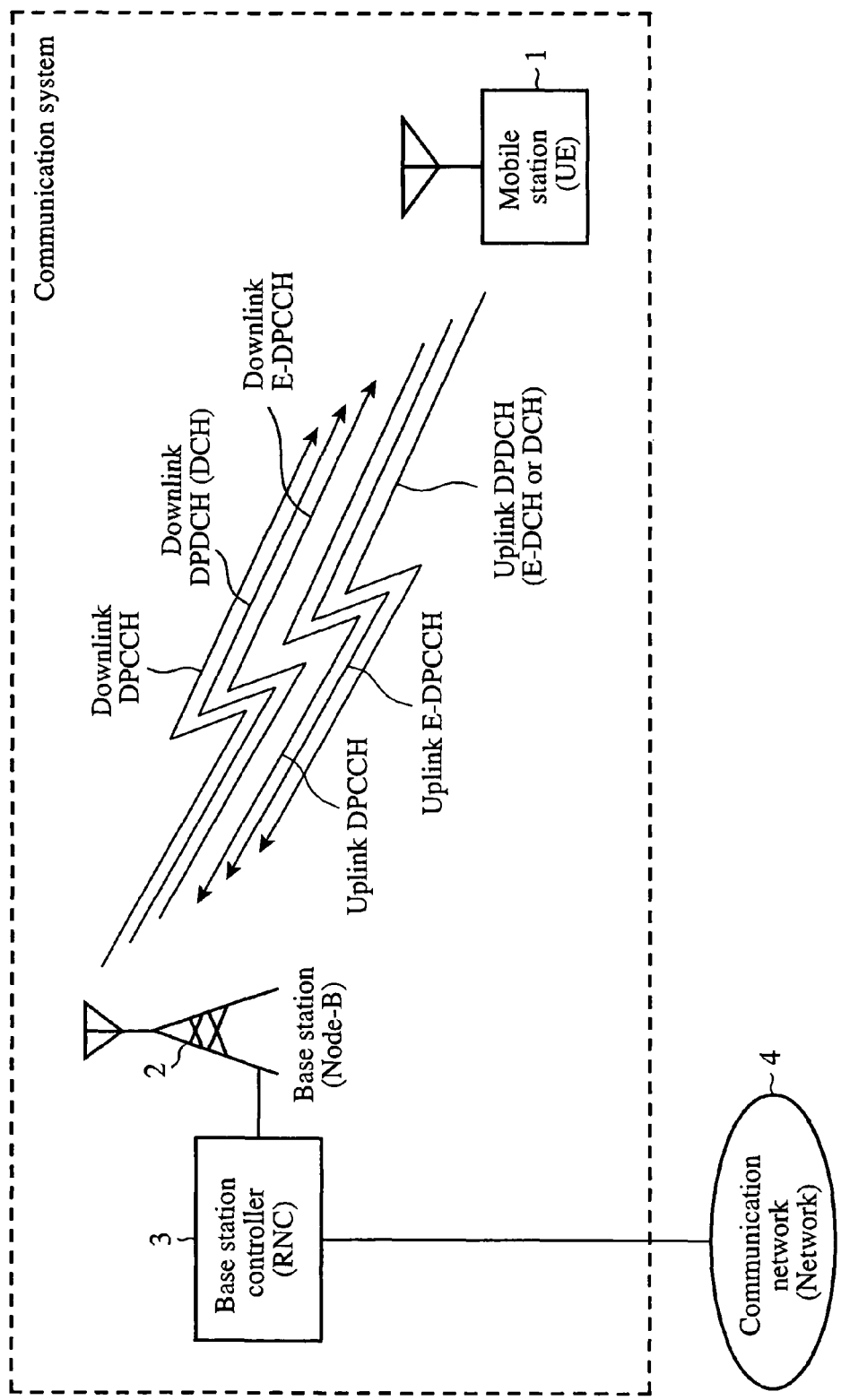
FIG. 1 is a block diagram showing a communication system in accordance with embodiment 1 of the present invention.

FIG. 1 is a block diagram showing a communication system in accordance with embodiment 1 of the present invention. In the figure, the communication system includes a mobile station 1, a base station 2, and a base station controller 3.

The base station 2 covers a specific communication area (generally called a sector or cell), and carries out wireless communications with a plurality of mobile stations 1. For the sake of simplicity, only one mobile station is shown in FIG. 1. However, a plurality of mobile stations can be provided. The mobile station 1 and base station 2 communicate with each other using a plurality of radio links (or channels).

The base station controller 3 is connected to an external communication network 4, such as a public telephone network or the Internet, and relays packet communications between the base station 2 and the communication network 4.

In the W-CDMA standard, the mobile station 1 is called UE (User Equipment), the base station 2 is called Node-B, and the base station controller 3 is called RNC (Radio Network Controller).

An uplink DPCCH (Dedicated Physical Control CHannel) is a physical channel for control (Physical Control Channel) from the mobile station 1 to the base station 2, and a downlink DPCCH is a channel for physical-layer control from the base station 2 to the mobile station 1. Using the above-mentioned two DPCCHs, control operations, such as a synchronous control operation for the transmit-and-receive timing between the mobile station 1 and the base station 2, are carried out, and a radio link under communications is maintained.

An uplink DPDCH (Dedicated Physical Data CHannel) is a physical-layer channel for data transmission (Physical Data Channel) via which data associated with a channel (DCH) from the mobile station 1 to the base station 2, which complies with the conventional standards, is transmitted, or a physical-layer channel for data transmission via which information data associated with a packet data capable channel (E-DCH) in accordance with the present invention is transmitted.

A downlink DPDCH is a physical-layer channel for data transmission via which data associated with a channel (DCH) from the base station 2 to the mobile station 1, which complies with the conventional standards, is transmitted.

An uplink E-DPCCH (Enhanced-Dedicated Physical Control CHannel) is a channel for physical-layer control via which mobile station information is notified from the mobile station 1 to the base station 2.

A downlink E-DPCCH is a channel via which a notification of either a result of assignment of radio resources in the base station 2 or a result of determination (judgment) of reception of data in the base station 2 is provided to the mobile station 1.

The above-mentioned various channels include new channels which are not specified in the conventional standards, and such new channels can be introduced through extension of the specifications of the conventional standards or through simple insertion of the new channels into the specifications of the conventional standards. However, whether such new channels are introduced through extension of the specifications of the conventional standards or through simple insertion of the new channels into the specifications of the conventional standards is undecided, and, if the new channels are specified as a new standard, the formats of the new channels will be specified additionally in a new release of the written standard TS25.211 while compatibility (what is called Backward Compatibility) with the conventional standards is secured.

Next, the internal structure of the mobile station 1 will be explained with reference to FIGS. 2 to 7.

Figure 2:
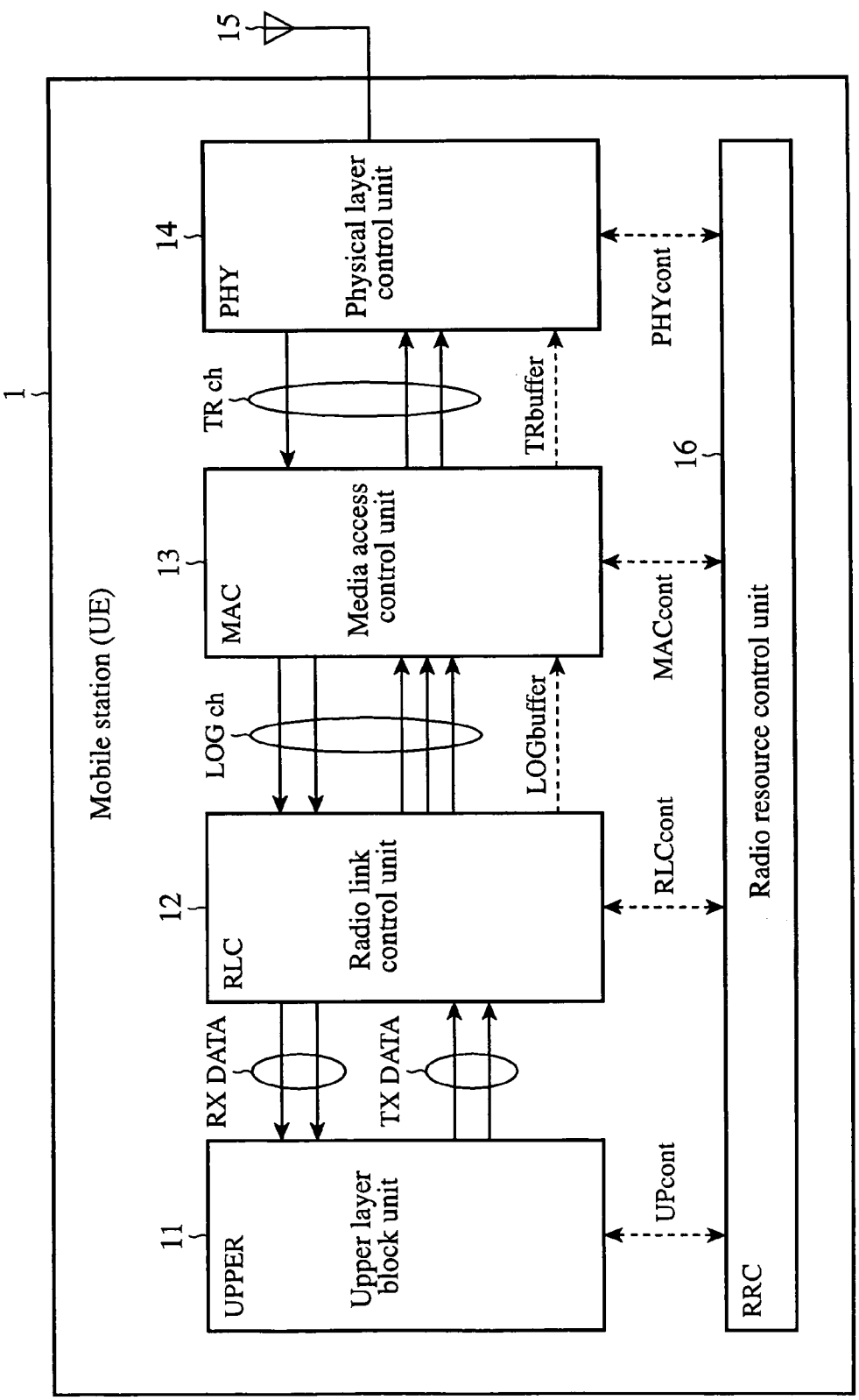
FIG. 2 is a block diagram showing a mobile station in accordance with embodiment 1 of the present invention.

FIG. 2 is a block diagram showing the mobile station 1 in accordance with embodiment 1 of the present invention. In the figure, an upper layer block unit 11 is called UPPER, and carries out predetermined processing using an application or a known technique intended for a higher-level protocol layer, such as a TCP/IP layer. While outputting one or more data (Tx Data) to be transmitted to the base station 2 to a radio link control unit 12, the upper layer block unit 11 accepts one or more received data (Rx Data) from the radio link control unit 12. In accordance with this embodiment 1, for the sake of simplicity, it is assumed that the upper layer block unit 11 outputs transmission data (Tx Data) corresponding to two types of communication services to the radio link control unit 12.

The radio link control unit 12 is called RLC (Radio Link Control), and receives and transmits data (Tx Data and Rx Data) from and to the upper layer block unit 11. One or more logical channels (LOG ch: Logical Channel) are established between the radio link control unit 12 and a media-access control unit 13, and the radio link control unit 12 transmits or receives data to or from the media-access control unit 13 using the one or more logical channels. The radio link control unit 12 also outputs amount-of-data information (LOG-buffer) about the amount of transmission data stored in an internal transmit buffer thereof to the media-access control unit 13.

The media-access control unit 13 is called MAC (Media Access Control), and transmits or receives data to or from the radio link control unit 12. One or more transport channels (TR ch: Transport CHannel) are established between the media-access control unit 13 and a physical layer control unit 14, and the media-access control unit 13 transmits or receives data to or from the physical layer control unit 14 using the one or more transport channels. The media-access control unit 13 also outputs amount-of-data information (TRbuffer) about the amount of transmission data stored in an internal transmit buffer thereof to the physical layer control unit 14.

The physical layer control unit 14 is called PHY (PHYsical), and transmits or receives data to or from the media-access control unit 13. The physical layer control unit 14 also carries out wireless communications with the base station 2 by transmitting or receiving a radio frequency signal to or from the base station by way of an antenna 15.

A radio resource control unit 16 is called RRC (Radio Resource Control), and, in order to control the upper layer block unit 11, radio link control unit 12, media-access control unit 13, and physical layer control unit 14, transmit or receive various types of information (UPcont, RLCcont, MACcont, and PHYcont) to or from them, respectively.

An amount-of-data information determining means includes the radio link control unit 12 and media access control unit 13, and a transmitting means includes the physical layer control unit 14.

Figure 3:
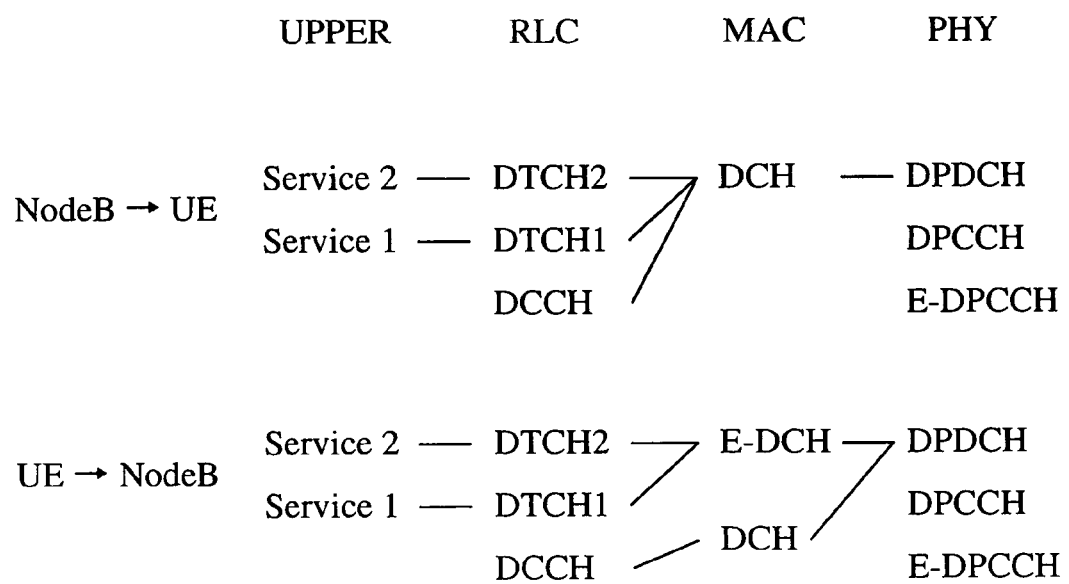
FIG. 3 is a diagram showing a multiplexing relationship between each of an upper layer block unit, a radio link control unit, a media access control unit and a physical layer control unit in the mobile station, and various channels.

FIG. 3 is a diagram showing a relationship between the upper layer block unit 11, radio link control unit 12, media access control unit 13 and physical layer control unit 14 in the mobile station 1, and multiplexing of various channels.

In FIG. 3, "NodeB→UE" is a downlink and shows that the mobile station is the receive side, and "UE→NodeB" is an uplink and shows that the mobile station is the transmit side.

In accordance with this embodiment 1, it is assumed that two communication services (Service1 and Service2) are performed simultaneously. Transmission and reception data (Tx Data and Rx Data) associated with Service1 are assigned to a logical channel 1 (DTCH1: Dedicated Traffic CHannel 1), and transmission and reception data (Tx Data and Rx Data) associated with Service2 are assigned to a logical channel 2 (DTCH2: Dedicated Traffic CHannel 2).

In transmission (UE→NodeB) from the mobile station 1 to the base station 2, the logical channel 1 (DTCH1) and logical channel 2 (DTCH2) are multiplexed into a packet data capable channel (E-DCH) which is a transport channel by the media access control unit 13, and the packet data capable channel (E-DCH) is assigned to the uplink DPDCH by the physical layer control unit 14.

Mobile station information to be transmitted from the radio resource control unit 16 to the base station controller 3 through the base station 2 is set up as data associated with a logical channel (DCCH: Dedicated Control CHannel) for control by the radio resource control unit 16, and the data is multiplexed into an uplink DCH by the media access control unit 13.

Furthermore, the packet data capable channel (E-DCH) and uplink DCH are multiplexed into an uplink DPDCH by the physical layer control unit 14.

The physical layer control unit 14 generates DPCCH and E-DPCCH which are channels for uplink control.

On the other hand, in reception from the base station 2 (NodeB→UE), downlink DPDCH data is assigned to a downlink DCH, and the logical channel 1 (DTCH1), logical channel 2 (DTCH2), and logical channel DCCH for control are multiplexed into the downlink DCH.

The physical layer control unit 14 also uses a downlink DPCCH and a downlink E-DPCCH, as well as the uplink DPCCH and uplink E-DPCCH.

Figure 4:
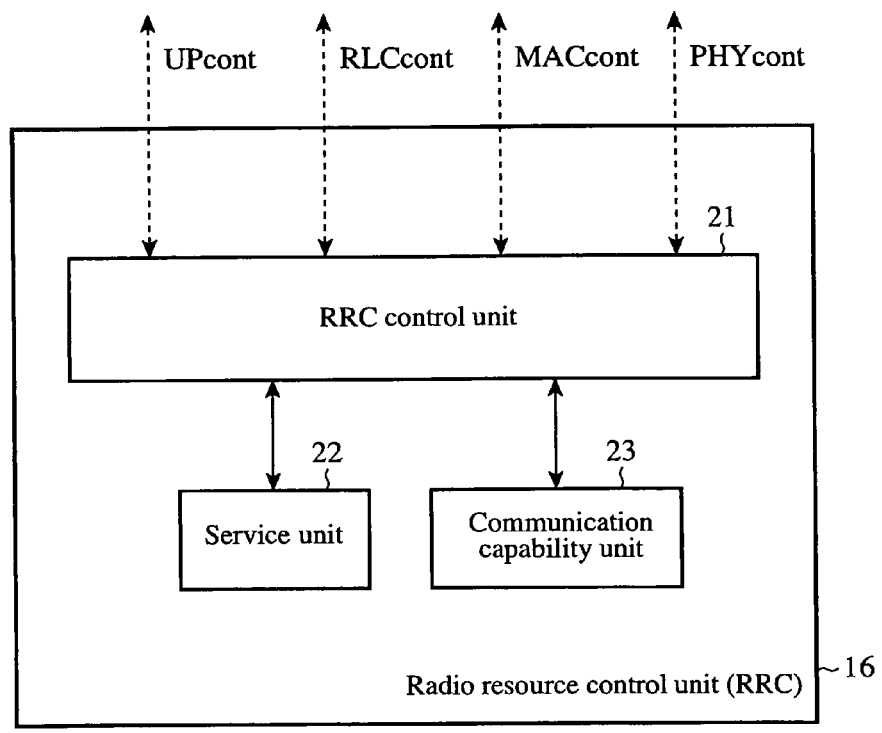
FIG. 4 is a block diagram showing the internal structure of a radio resource control unit of the mobile station.

FIG. 4 is a block diagram showing the internal structure of the radio resource control unit 16 of the mobile station 1. In the figure, an RRC control unit 21 controls the operation of the whole of the radio resource control unit 16, and, in order to control the upper layer block unit 11, radio link control unit 12, media access control unit 13, and physical layer control unit 14, transmits or receives various types of information (UPcont, RLCcont, MACcont, and PHYcont) to or from them, respectively. Particularly, the RRC control unit 21 obtains information including setup information about communication services from the upper layer block unit 11, and outputs the information including the setup information to the radio link control unit 12, media access control unit 13, and physical layer control unit 14.

A service unit 22 determines detailed settings on communication services between the mobile station 1 and the base station controller 3, and stores information about the detailed settings therein.

A communication capability unit 23 stores information about various types of communication capabilities (e.g., maximum transmission power, a maximum transmission rate, a total memory size, etc.) of the mobile station 1 therein, and notifies the information on the various types of communication capabilities to the base station 2 by way of the radio link control unit 12, media access control unit 13, and physical layer control unit 14 when the mobile station starts communicating with the base station.

Figure 5:
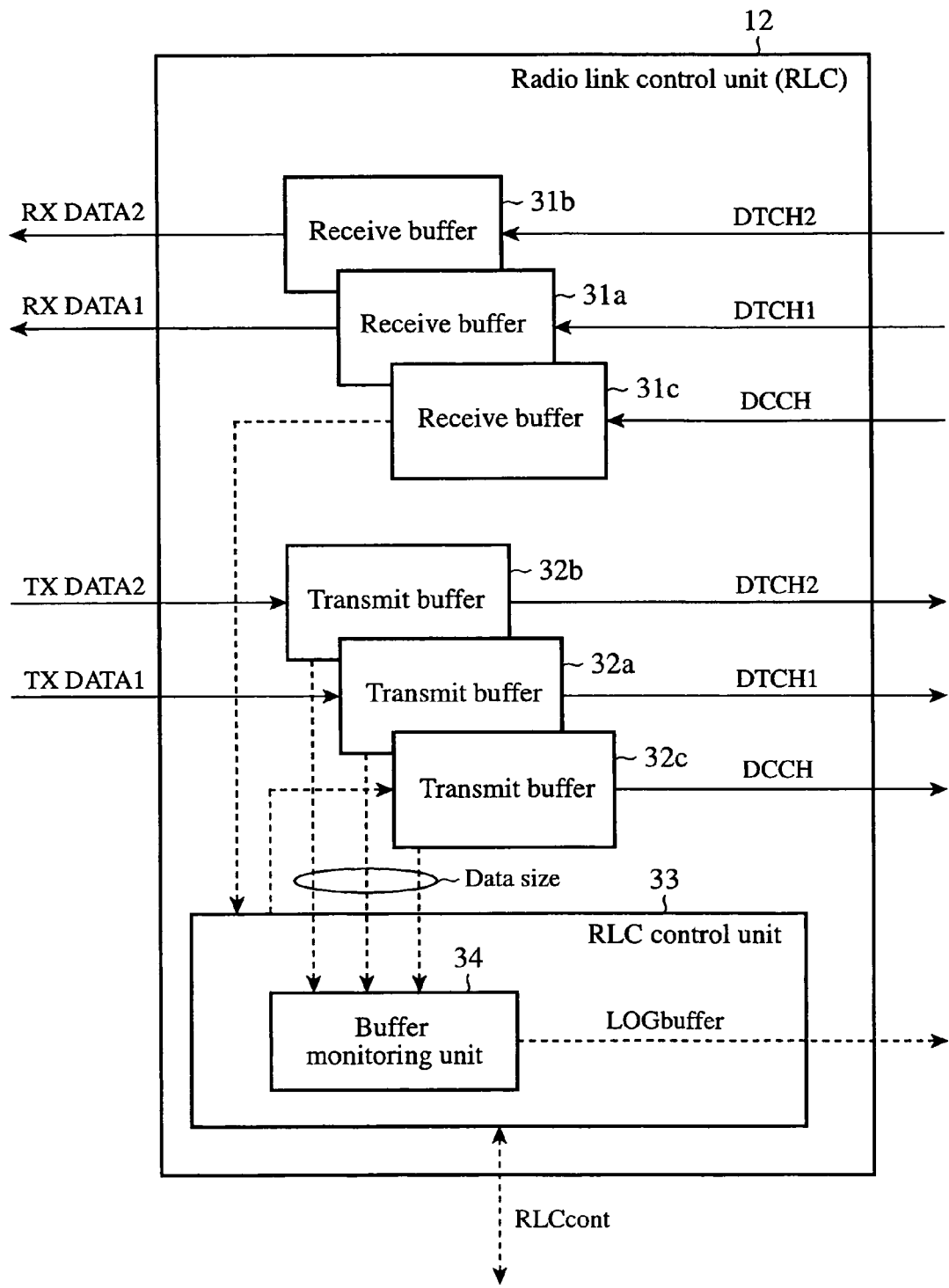
FIG. 5 is a block diagram showing the internal structure of the radio link control unit of the mobile station.

FIG. 5 is a block diagram showing the internal structure of the radio link control unit 12 of the mobile station 1. In the figure, receive buffers 31a and 31b accept data associated with the logical channels (DTCH1 and DTCH2) from the media access control unit 13, respectively, and output them to the upper layer block unit 11 as data (RX DATA1 and RX DATA2) associated with the communication services, respectively. Another receive buffer 31c accepts data associated with the logical channel (DCCH) from the media access control unit 13, and outputs it to an RLC control unit 33 as control information.

Transmit buffers 32a and 32b accept data (TX DATA1 and TX DATA2) associated with the communication services from the upper layer block unit 11, respectively, and output them to the media access control unit 13 as data associated with the logical channels (DTCH1 and DTCH2), respectively. Another transmit buffer 32c accepts control information from the upper layer block unit 11, and outputs it to the media access control unit 13 as data associated with the logical channel (DCCH).

The RLC control unit 33 controls the whole of the radio link control unit 12. A buffer monitoring unit 34 monitors data (i.e., yet-to-be-transmitted data) stored in the transmit buffers 32a, 32b, and 32c, and outputs amount-of-data information (LOGbuffer) indicating the amount of data stored in the transmit buffers 32a, 32b, and 32c to the media access control unit 13.

Figure 6:
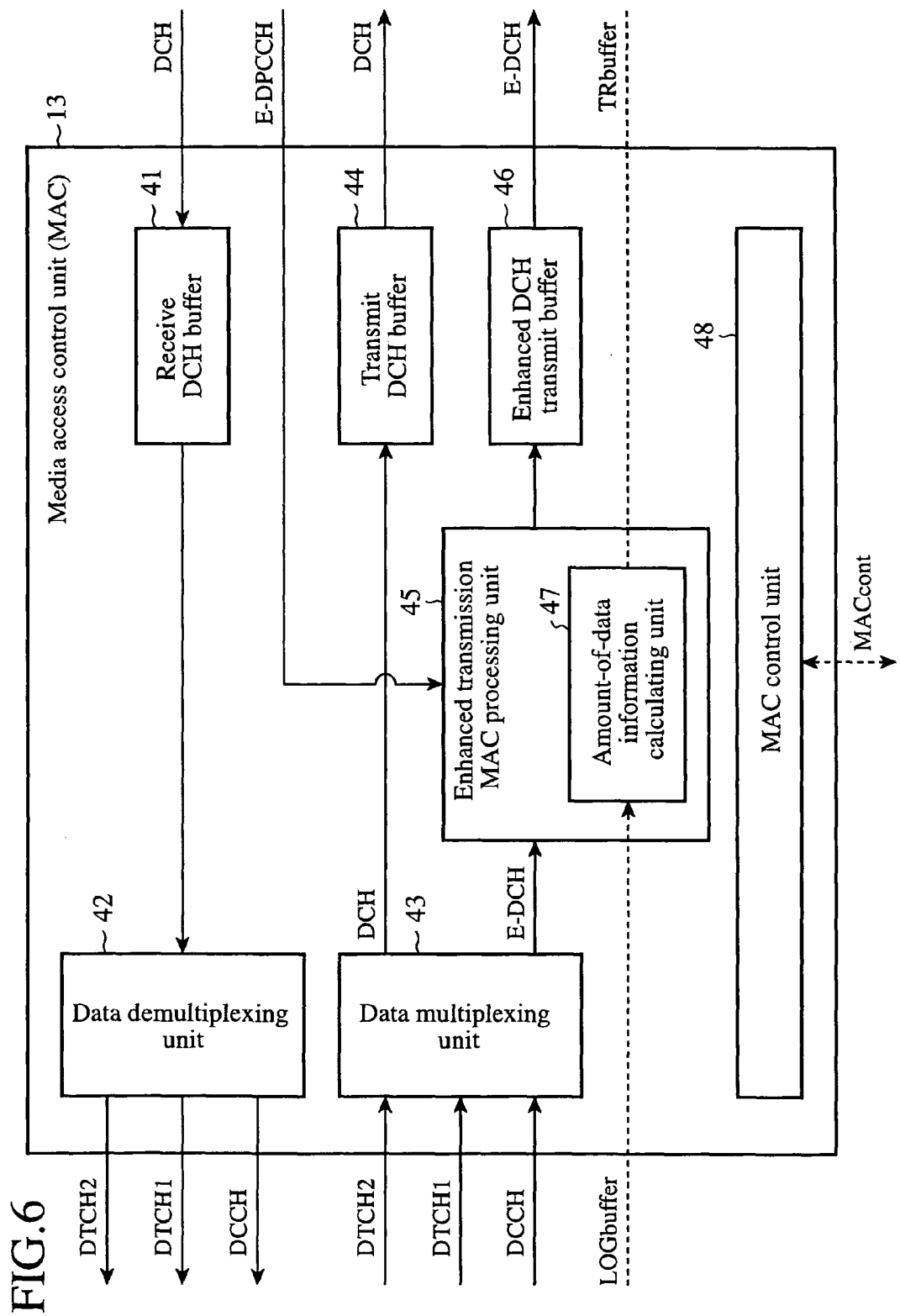
FIG. 6 is a block diagram showing the internal structure of the media access control unit of the mobile station.

FIG. 6 is a block diagram showing the internal structure of the media access control unit 13 of the mobile station 1. In the figure, a receive DCH buffer 41 accepts received DCH data from the physical layer control unit 14, and outputs the received DCH data to a data demultiplexing unit 42.

The data demultiplexing unit 42 demultiplexes the received DCH data into a plurality of data about the plurality of logical channels (DTCH1, DTCH2, and DCCH) using a known technique, and outputs them to the receive buffers 31a, 31b, and 31c of the radio link control unit 12, respectively.

A data multiplexing unit 43 multiplexes (or distributes) a plurality of data associated with the plurality of logical channels (DTCH1, DTCH2, and DCCH) outputted from the transmit buffers 32a, 32b, and 32c of the radio link control unit 12 into multiplexed data using a known technique, and outputs the multiplexed data to a transmit DCH buffer 44 as DCH data. The data multiplexing unit 43 also outputs it to an enhanced transmission MAC processing unit 45 as E-DCH data.

The enhanced transmission MAC processing unit 45 accepts the E-DCH data from the data multiplexing unit 43, and outputs the E-DCH data to an enhanced DCH transmit buffer 46. The enhanced transmission MAC processing unit 45 also accepts the amount-of-data information (LOGbuffer) from the buffer monitoring unit 34 of the radio link control unit 12, and outputs it to an amount-of-data information calculating unit 47 as amount-of-data information (LOGbuffer). The enhanced transmission MAC processing unit 45 also accepts data associated with the downlink E-DPCCH which is received and demodulated by the physical layer control unit 14.

The amount-of-data information calculating unit 47 calculates the amount of data on a communication-service-by-communication-service basis (or for each of the logical channels for data transmission among the logical channels currently being assigned to the E-DCH (i.e., for each of DTCH1 and DTCH2)) on the basis of the mount-of-data information (LOGbuffer), and outputs the communication-service-by-communication-service (or logical-channel-by-logical-channel) amount-of-data information (TRbuffer) to the physical layer control unit 14.

A MAC control unit 48 controls the whole of the media access control unit 13 and also transmits or receives information (MACcont) to or from the radio resource control unit 16.

Figure 7:
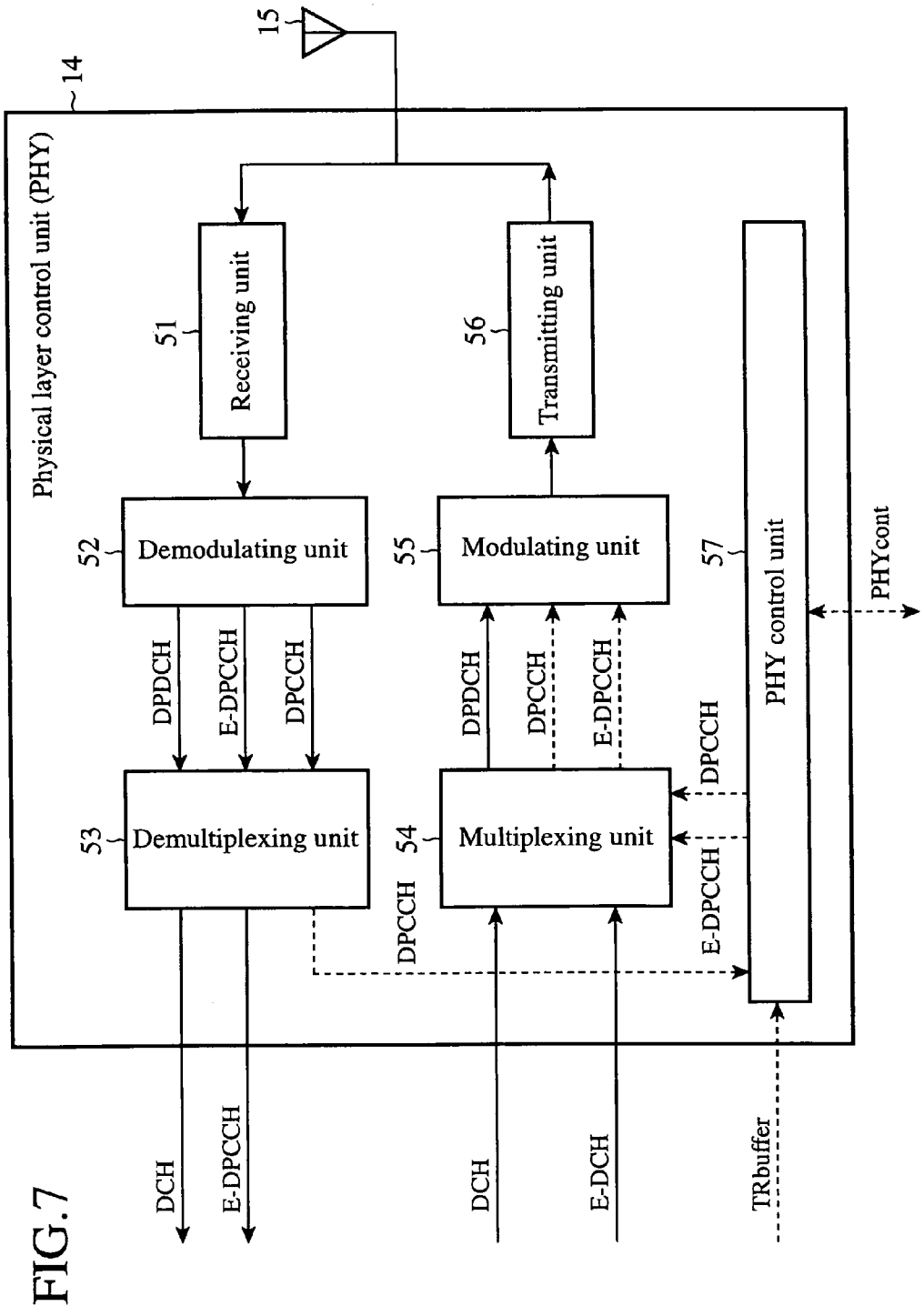
FIG. 7 is a block diagram showing the internal structure of the physical layer control unit of the mobile station.

FIG. 7 is a block diagram showing the internal structure of the physical layer control unit 14 of the mobile station 1. In the figure, when the antenna 15 receives a radio frequency signal transmitted from the base station 2, a receiving unit 51 converts the radio frequency signal into a baseband signal using a known technique.

A demodulating unit 52 demodulates the baseband signal outputted from the receiving unit 51 using a known technique, and outputs the demodulated baseband signal to a demultiplexing unit 53 as data associated with the various types of downlink physical channels (DPDCH, DPCCH, and E-DPCCH).

The demultiplexing unit 53 demultiplexes the data associated with the various types of downlink physical channels (DPDCH, DPCCH, and E-DPCCH) into data associated with the transport channel (DCH) and data associated with the physical control channels (DPCCH and E-DPCCH) using a known technique. The demultiplexing unit 53 also outputs the DCH data and E-DPCCH data to the media access control unit 13, and outputs the DPCCH data to a PHY control unit 57. In accordance with this embodiment 1, the transport channel which is multiplexed into the receive DPDCH includes only one DCH.

A multiplexing unit 54 accepts data associated with the uplink transport channels (DCH and E-DCH) outputted from the media access control unit 13, and data associated with the uplink DPCCH and data associated with the uplink E-DPCCH which are outputted from the PHY control unit 57, and multiplexes these data using a known technique and outputs them to a modulating unit 55 as data associated with the various types of transmission physical channels (DPDCH, DPCCH, and E-DPCCH).

The modulating unit 55 modulates the data associated with the various types of transmission physical channels (DPDCH, DPCCH, and E-DPCCH) outputted from the multiplexing unit 54 using a known technique, and outputs the modulated data to a transmitting unit 56 as a transmission baseband signal.

In this case, the modulating unit 55 code-multiplexes the data associated with DPDCH, data associated with DPCCH, and data associated with E-DPCCH using different spread codes. The multiplexing method which the modulating unit uses is not limited to this example.

The transmitting unit 56 converts the transmission baseband signal outputted from the modulating unit 55 into a radio frequency signal using a known technique, and transmits the radio frequency signal to the base station 2 by way of the antenna 15.

The PHY control unit 57 controls the whole of the physical layer control unit 14, and transmits or receives information (PHYcont) to or from the radio resource control unit 16. The PHY control unit 57 also accepts the amount-of-data information (TRbuffer) from the amount-of-data information calculating unit 47 of the media access control unit 13, and outputs the data associated with DPCCH and E-DPCCH which are uplink radio channels to the multiplexing unit 54.

Next, the internal structure of the base station 2 will be explained with reference to FIGS. 8 to 10.

However, since the fundamental structure of the base station 2 is the same as a structure in which the uplink related components and downlink related link related components are interchanged in the internal structure of the mobile station 1 shown in FIGS. 2 to 7, only components different from those of the mobile station 1 will be explained mainly.

Figure 8:
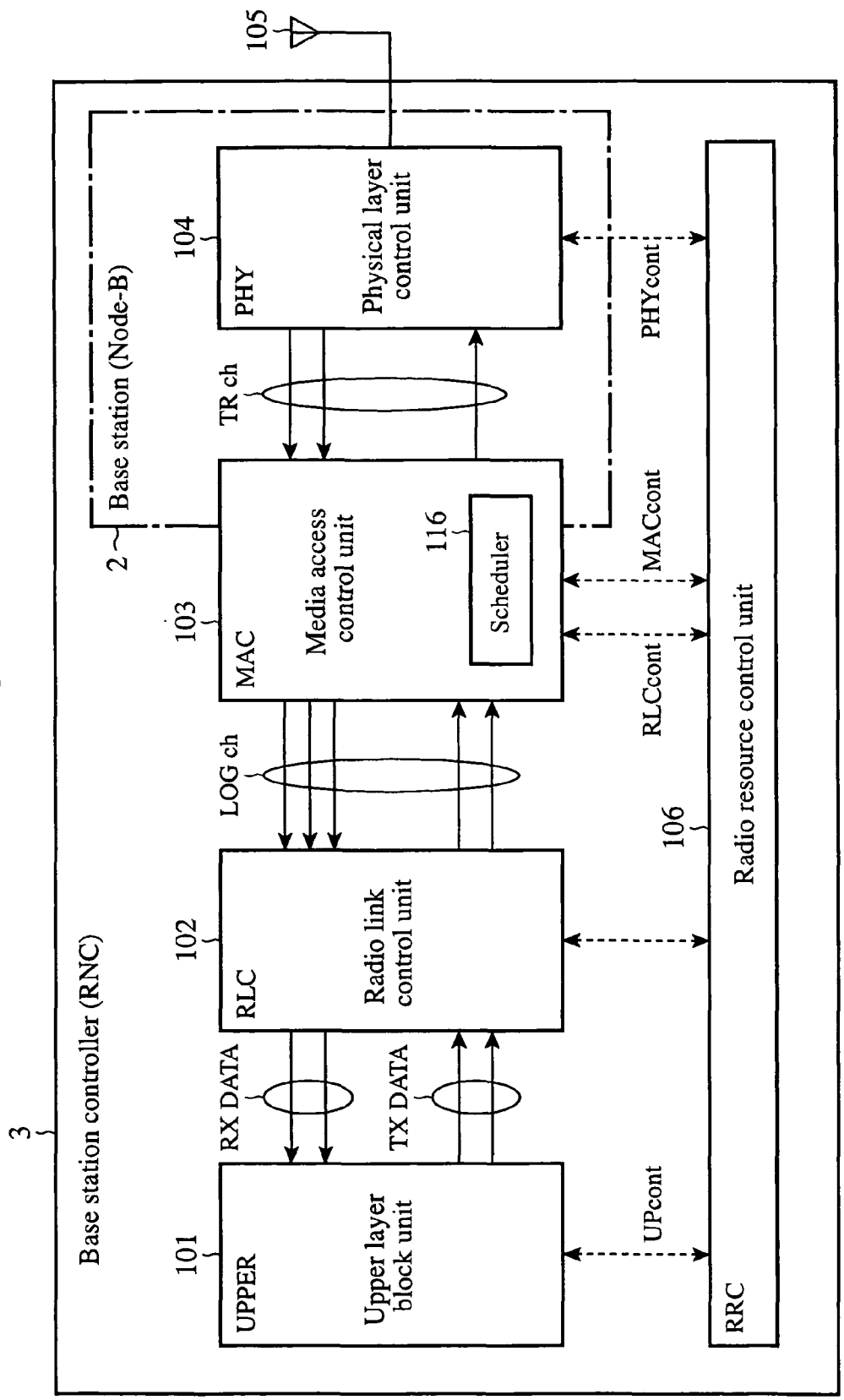
FIG. 8 is a block diagram showing a base station and a base station controller in accordance with embodiment 1 of the present invention.

FIG. 8 is a block diagram showing the base station 2 and base station controller 3 in accordance with embodiment 1 of the present invention.

The base station 2 and base station controller 3 differ from the mobile station 1 in that their components are distributed in the base station controller 3 and base station 2, as compared with the mobile station 1 shown in FIG. 2 in which all the components are disposed therein.

In other words, while an upper layer block unit 101, a radio link control unit 102, and a radio resource control unit 106 are arranged in the base station controller 3, a physical layer control unit 104 is arranged in the base station 2. A media access control unit 103 is so disposed as to extend over both the base station controller 3 and the base station 2.

The media access control unit 103 differs from that of the mobile station 1 in that it includes a scheduler 116 for controlling radio resources for uplink E-DCH transmission. The physical layer control unit 104 constitutes a receiving means and a notifying means, and the media access control unit 103 constitutes a transmission timing determining means.

Since the upper layer block unit 101, radio link control unit 102, and radio resource control unit 106 are the same as those of the mobile station 1, respectively, the explanation of these components will be omitted hereafter.

Figure 9:
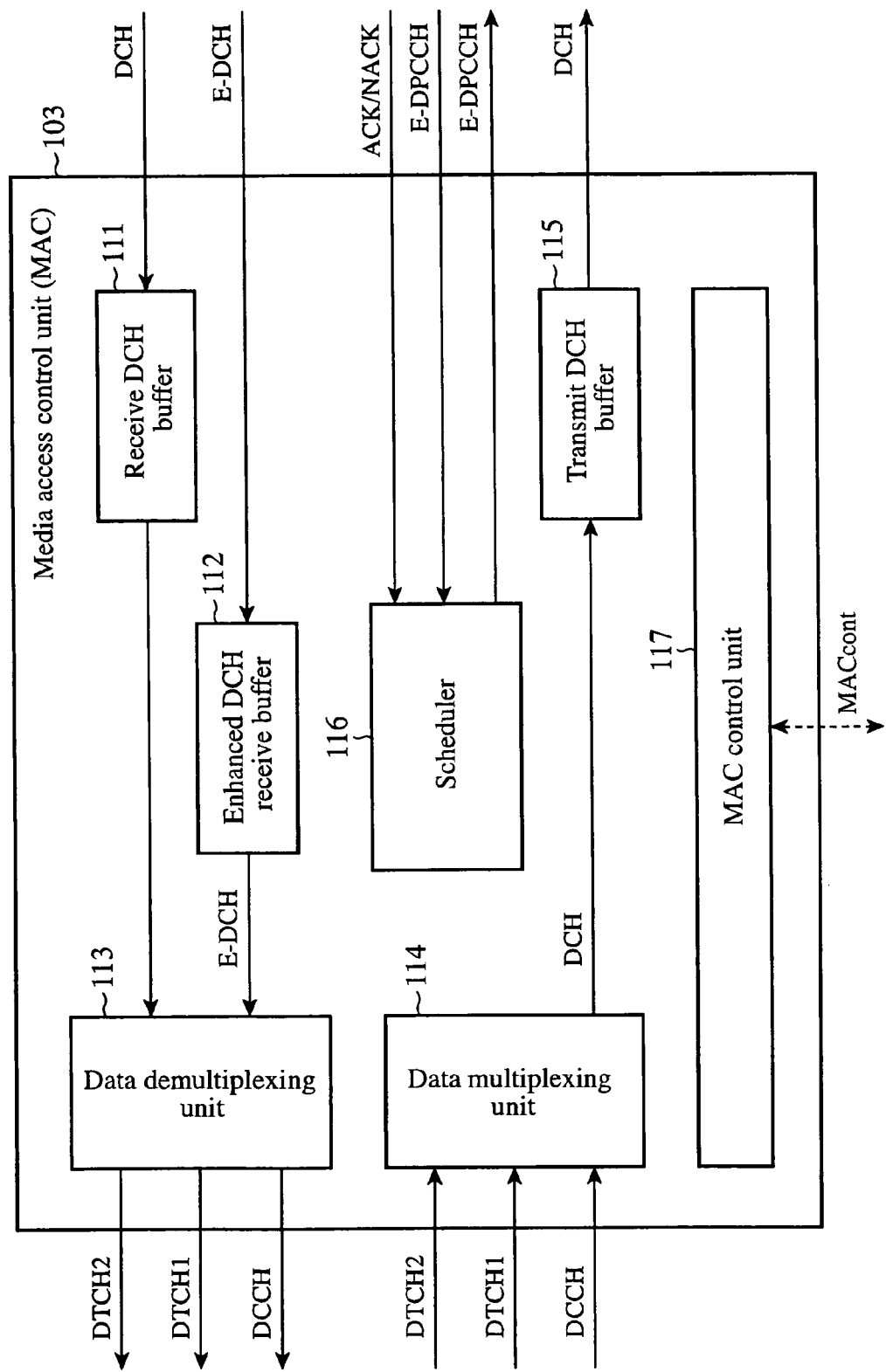
FIG. 9 is a block diagram showing the internal structure of a media access control unit included in each of the base station and base station controller.

FIG. 9 is a block diagram showing the internal structure of the media access control unit 103 which extends over both the base station 2 and the base station controller 3. In the figure, a receive DCH buffer 111 accepts received DCH data from the physical layer control unit 104, and outputs the received DCCH data to a data demultiplexing unit 113.

An enhanced DCH receive buffer 112 accepts E-DCH data from the physical layer control unit 104, and outputs the E-DCH data to the data demultiplexing unit 113.

The data demultiplexing unit 113 demultiplexes the received DCH data and E-DCH data into a plurality of data associated with the plurality of logical channels (DTCH1, DTCH2, and DCCH) using a known technique, and outputs them to the receive buffers of the radio link control unit 102.

The data multiplexing unit 114 multiplexes (or distributes) a plurality of data associated with the plurality of logical channels (DTCH1, DTCH2, and DCCH) outputted from the transmit buffers of the radio link control unit 102 into data using a known technique, and outputs it to a transmit DCH buffer 115 as DCH data.

The scheduler 116 accepts a reception determination result (ACK/NACK) and data associated with the uplink E-DPCCH from the physical layer control unit 104, and outputs data associated with the downlink E-DPCCH to the physical layer control unit 104.

A MAC control unit 117 controls the whole of the media access control unit 103, and transmits or receives information (MACcont) to or from the radio resource control unit 106.

Figure 10:
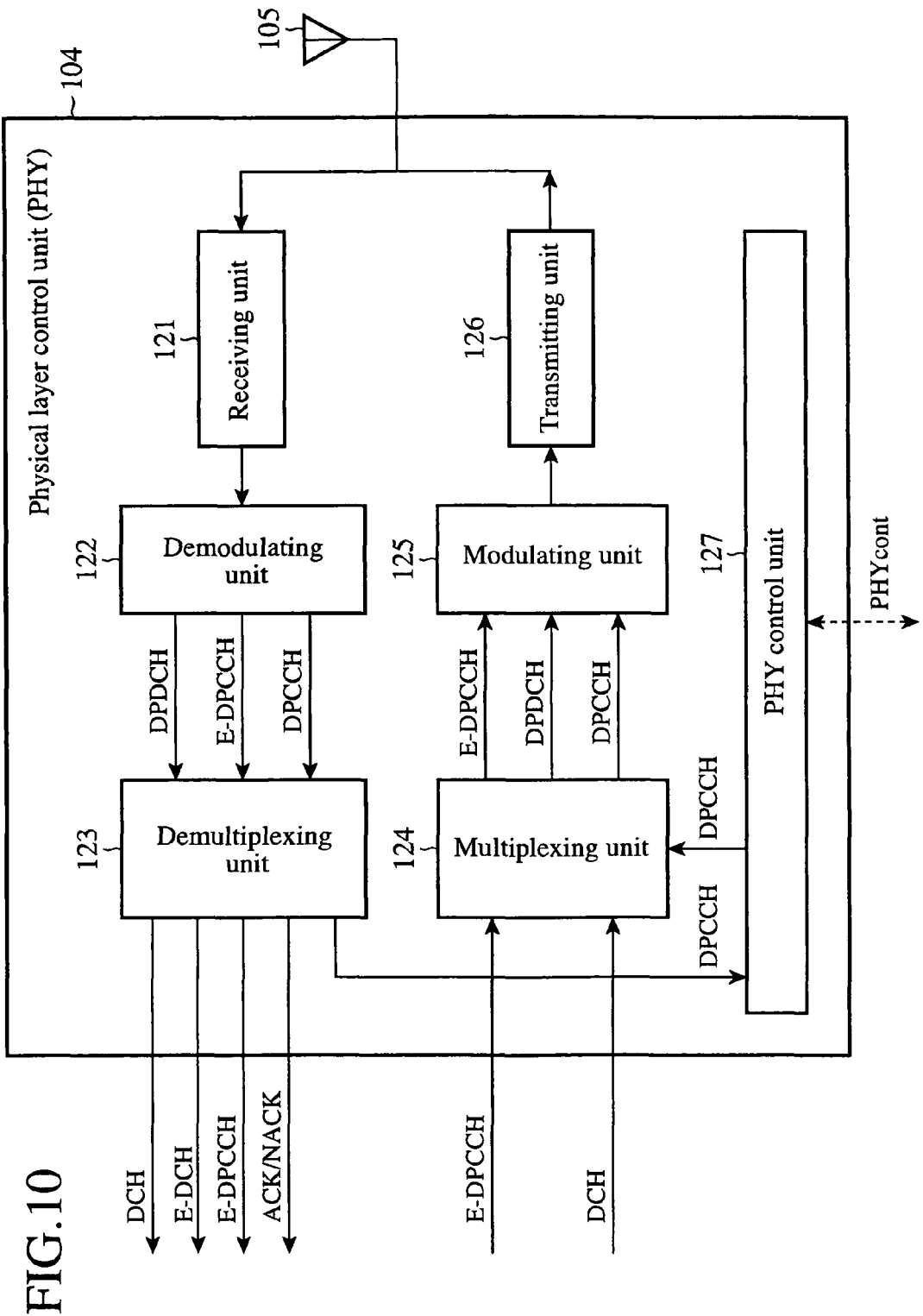
FIG. 10 is a block diagram showing the internal structure of a physical layer control unit of the base station.

FIG. 10 is a block diagram showing the internal structure of the physical layer control unit 104 of the base station 1. In the figure, when an antenna 105 receives a radio frequency signal transmitted from mobile station 1, a receiving unit 121 converts the radio frequency signal into a baseband signal using a known technique.

A demodulating unit 122 demodulates the baseband signal outputted from the receiving unit 121 using a known technique, and outputs it to a demultiplexing unit 123 as data associated with the various types of uplink physical channels (DPDCH, DPCCH, and E-DPCCH).

The demultiplexing unit 123 demultiplexes the data associated with the various types of uplink physical channels (DPDCH, DPCCH, and E-DPCCH) into data associated with the transport channels (DCH and E-DCH) and data associated with the physical control channels (DPCCH and E-DPCCH) using a known technique. The demultiplexing unit 123 also outputs the DCH data, E-DCH data, and E-DPCCH data to the media access control unit 103. The demultiplexing unit 123 also outputs a reception determination result (ACK/NACK) indicating whether or not the E-DCH data has been received correctly, and the uplink E-DPCCH data to the scheduler 116 of the media access control unit 103, and outputs the uplink DPCCH data to a PHY control unit 127.

A multiplexing unit 124 accepts the data associated with the downlink transport channel (DCH) outputted from the media access control unit 103, downlink E-DPCCH data outputted from the scheduler 116, and downlink DPCCH data outputted from the PHY control unit 127, and multiplexes these data into data using a known technique and outputs the data to a modulating unit 125 as data associated with the various types of transmission physical channels (DPDCH, DPCCH, and E-DPCCH).

The modulating unit 125 modulates the data associated with the various types of transmission physical channels (DPDCH, DPCCH, and E-DPCCH) outputted from the multiplexing unit 124 using a known technique, and outputs the modulated data to a transmitting unit 126 as a transmission baseband signal.

In this case, the modulating unit 125 code-multiplexes the data associated with DPDCH, data associated with DPCCH, and data associated with E-DPCCH using different spread codes. The multiplexing method which the modulating unit uses is not limited to this example.

The transmitting unit 126 converts the transmission baseband signal outputted from the modulating unit 125 into a radio frequency signal using a known technique, and transmits the radio frequency signal to the mobile station 1 by way of the antenna 105.

The PHY control unit 127 controls the whole of the physical layer control unit 104, and transmits or receives information (PHYcont) to or from the radio resource control unit 106.

Figure 11:
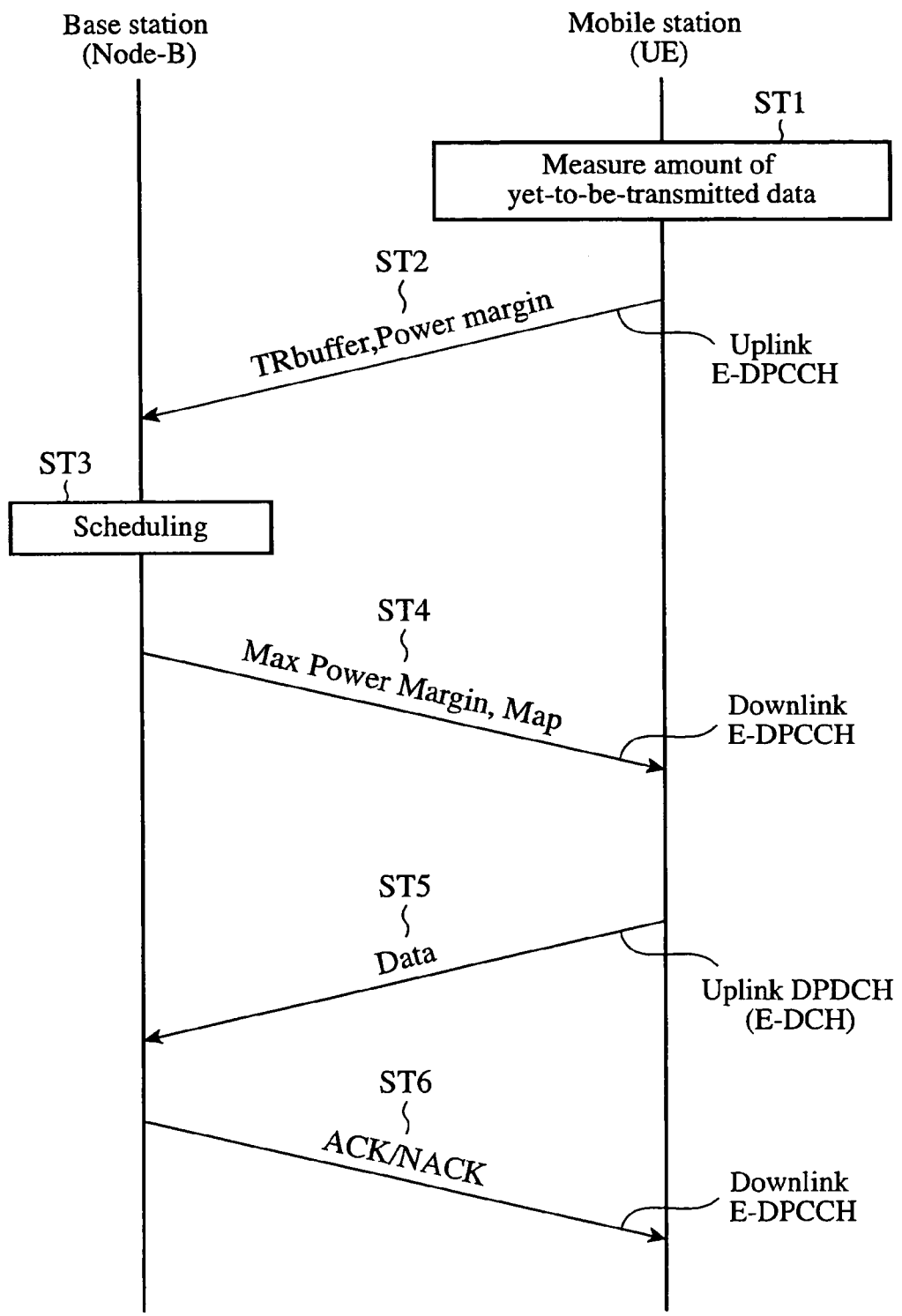
FIG. 11 is a transmission flow diagram showing a transmission flow of packet data (E-DCH) in an uplink.

FIG. 11 is a transmission flow diagram showing a transmission flow of packet data (E-DCH) in uplinks.

Next, the operation of the communication system in accordance with this embodiment of the present invention will be explained.

First, the mobile station 1 measures the amount of yet-to-be-transmitted data (in step ST1).

In other words, data associated with service 1 (Service1) and service 2 (Service2) generated in the upper layer block unit 11 of the mobile station 1 are stored in the transmit buffers 32*a* and 32*b* of the radio link control unit 12 as transmission data (TX DATA1 and TX DATA2), respectively, and are further outputted from the transmit buffers 32*a* and 32*b* to the data multiplexing unit 43 of the media access control unit 13 as data associated with the logical channels for transmission (DTCH1 and DTCH2), respectively.

Furthermore, various types of mobile station control information about data transmission for each service from the service unit 22 of the radio resource control unit 16 are stored, as control information (RLCont), in the transmit buffer 32*c* via the RLC control unit 34, and are further outputted from the transmit buffer 32c to the data multiplexing unit 43 of the media access control unit 13 as data associated with the logical channel (DCCH) for control.

At this time, each of the transmit buffers 32a, 32b, and 32c of the radio link control unit 12 outputs data size information (Data size) on the amount of data stored therein to the buffer monitoring unit 34 periodically or at the time when the amount of data changes.

The buffer monitoring unit 34 of the radio link control unit 12 outputs the three pieces of data size information outputted from the transmit buffers 32a, 32b, and 32c as amount-of-data information (LOGbuffer) to the amount-of-data information calculating unit 47 of the media access control unit 13.

When receiving the amount-of-data information (LOGbuffer) from the buffer monitoring unit 34, the amount-of-data information calculating unit 47 (i.e., the amount-of-data information determining means) of the media access control unit 13 calculates the amount of data for each of the communication services (i.e., the amount of data for service 1 and the amount of data for service 2) on the basis of the amount-of-data information (LOGbuffer). As an alternative, the amount-of-data information calculating unit 47 calculates the amount of data for each of the logical channels for data transmission (i.e., the amount of data for DTCH1 and the amount of data for DTCH2) which are included in the logical channels currently being assigned to E-DCH.

The amount-of-data information calculating unit 47 then outputs the amount-of-data information (TRbuffer) which is calculated on a communication-service-by-communication-service basis or for each of the logical channels for data transmission to the PHY control unit 57 of the physical layer control unit 14.

The mobile station 1 then notifies the uplink E-DPCCH to the base station 2 in order to make a request for assignment of the radio resources for uplink (in step ST2).

A concrete transmitting operation of transmitting data associated with the E-DPCCH of the mobile station 1 in step ST2 is as follows.

First, the PHY control unit 57 of the physical layer control unit 14 outputs the amount-of-data information (TRbuffer) to the multiplexing unit 54 as data associated with the uplink E-DPCCH.

The multiplexing unit 54 of the physical layer control unit 14 multiplexes the data associated with the uplink E-DPCCH outputted from the PHY control unit 57 onto the uplink E-DPCCH using a known technique.

The modulating unit 55 of the physical layer control unit 14 modulates the data associated with the uplink E-DPCCH which is multiplexed onto the uplink E-DPCCH by the multiplexing unit 54 using a known technique, and outputs the modulated data to the transmitting unit 56 as a transmission baseband signal.

The transmitting unit 56 of the physical layer control unit 14 converts the transmission baseband signal outputted from the modulating unit 55 into a radio frequency signal using a known technique, and transmits the radio frequency signal to the base station 2 by way of the antenna 15.

The uplink E-DPCCH can include other mobile station information, such as the transmission power margin information (Power margin) which is shown when the channel USICCH for transmission request is explained in above-mentioned nonpatent reference 1, in addition to the amount-of-data information (TRbuffer). What types of information to be transmitted can be included in the uplink E-DPCCH depends upon the structure of the scheduler 116 mounted in the base station 2, and is not directly linked with the advantages of the present invention. The details of what types of information to be transmitted can be included in the uplink E-DPCCH are specified by the written standard TS25.331 (RRC signaling) and so on.

Hereafter, assume that the scheduler 116 of the base station 2 which is disposed as an assignment determining means carries out scheduling using the amount-of-data information (TRbuffer) and transmission power margin information (Power margin).

When multiplexing the amount-of-data information (TRbuffer) onto the uplink E-DPCCH, the PHY control unit 57 of the physical layer control unit 14 can convert the amount-of-data information (TRbuffer) into data in the form of one of various types of formats, as will be shown below.

(1) The amount of data (binary digit indication) of the transmit buffers which is calculated on a-communication-service-by-communication-service basis, or for each of the logical channels for data (DTCH1 and DTCH2) which are multiplexed onto E-DCH (2) Index (Index) indicating a combination of amounts of data (binary digit indication) shown in (1)

(3) The data occupation ratio (%) of each of the transmit buffers 32a, 32b, and 32c of the radio link control unit 12

(4) Index (Index) indicating a combination of data occupation ratios (%) shown in (3)

FIG. 12A is a diagram showing an example of the data occupation ratios according to services, and indexes each indicating a combination of the data occupation ratios according to services, and FIG. 12B is a diagram showing an example of the data occupation ratios of the transmit buffers 32a and 32b of the radio link control unit 12, and indexes each indicating a combination of the data occupation ratios of the transmit buffers 32a and 32b.

The channel format (Channel format) of the E-DPCCH is specified by the written standard TS25.211, and the multiplexing processing is specified by the written standard TS25.212. Furthermore, a correspondence between the amount-of-data information and index (Index) is specified by the written standard TS25.214.

Next, an E-DPCCH data receiving operation of the base station 2 in step ST2 is performed as follows.

When the antenna 105 receives the radio frequency signal transmitted from the mobile station 1, the receiving unit 121 of the physical layer control unit 104 converts the radio frequency signal into a baseband signal using a known technique.

When receiving the baseband signal from the receiving unit 121, the demodulating unit 122 of the physical layer control unit 104 demodulates the baseband signal using a known technique and outputs the data associated with the uplink E-DPCCH to the demultiplexing unit 123.

When receiving the data associated with the uplink E-DPCCH from the demodulating unit 122, the demultiplexing unit 123 of the physical layer control unit 104 outputs the E-DPCCH data to the scheduler 116 of the media access control unit 103.

When receiving the E-DPCCH data from the physical layer control unit 104, the scheduler 116 of the media access control unit 103 carries out control (scheduling) of radio resources for uplink assigned to each mobile station 1 on the basis of the E-DPCCH data (in step ST3).

A concrete scheduling operation of the base station 2 in step ST3 is performed as follows.

The scheduler 116 of the base station 2 makes the increase in the transmission power of each mobile station 1 which reflects the results of scheduling operation be equal to or smaller than a transmission power margin value, and compares the types and amounts of data of communication services for mobile stations 1 with one another so as to determine the assignment of the radio resources among the mobile stations.

As a method of assigning the radio resources among the mobile stations, any one of the following methods can be used. In the design of the base station 2 and communication system, the method of assigning the radio resources among the mobile stations is designed and selected so that the throughput of the whole cell is maximized, for example.

(1) A method of giving a higher priority to a mobile station 1 having a larger amount of yet-to-be-transmitted packets (2) A method of giving a higher priority to a mobile station 1 having a transmission power margin (3) A method of assigning the radio resources to the mobile stations in order that they have made a request for permission to transmit packets (4) A method of determining the order in which the radio resources are assigned to the mobile stations 1, and assigning the radio resources to the mobile stations 1 in the determined order (the method is called Round Robin)

(5) A method of assigning the radio resources to a mobile station 1 with little propagation loss or having a good communication environment with little interference on a priority basis (the method is called Max C/I)

(6) A method intermediate between Round Robin and Max C/I (the method is called Propotional Fair)

As a method of selecting a target on which the scheduling operation is to be performed, one of various types of methods including: (1) a method of carrying out the scheduling operation only on the E-DCH, while performing a control operation, which is done by related art base station controller 3, on the DCH; and (2) a method of performing a control operation on a target including the DCH under the control of related art base station controller 3 can be used, and, in the design of the base station 2 and communication system, the method of selecting a target on which the scheduling operation is to be performed is designed and selected so that the throughput of the whole cell is maximized.

In accordance with this embodiment 1, assume that as information indicating the scheduling results, the maximum transmission power margin (Max Power Margin) and mobile station transmission timing information (MAP) are used, and they are notified to the mobile station 1.

What type of information is selected as information about the scheduling results depends upon the operation of the scheduler 116 mounted in the base station 2, and is not directly linked with the advantages of the present invention. The details of what type of information is selected as information about the scheduling results is specified by the written standard TS25.331 (RRC signaling) and so on.

The base station 2 then notifies the information about the scheduling results to the mobile station 1 via the downlink E-DPCCH (in step ST4).

A concrete transmitting operation of the base station 2 in step ST4 is performed as follows.

The scheduler 116 of the base station 2 outputs, as E-DPCCH data, the maximum transmission power margin (Max Power Margin) and mobile station transmission timing information (MAP) which are the information about the scheduling results to the multiplexing unit 124 of the physical layer control unit 104.

The multiplexing unit 124 of the physical layer control unit 104 multiplexes the downlink E-DPCCH data outputted from the scheduler 116 onto the downlink E-DPCCH using a known technique.

The modulating unit 125 of the physical layer control unit 104 modulates the E-DPCCH data which is multiplexed onto the downlink E-DPCCH by the multiplexing unit 124 using a known technique, and outputs the modulated E-DPCCH data to the transmitting unit 126 as a transmission baseband signal.

The transmitting unit 126 of the physical layer control unit 104 converts the transmission baseband signal outputted from the modulating unit 125 into a radio frequency signal using a known technique, and transmits the radio frequency signal to the mobile station 1 by way of the antenna 105.

The maximum transmission power margin (Max Power Margin) which is the information about the scheduling results can be intended for only the E-DCH, or can be alternatively intended for total transmission power including the DCH. The details of the maximum transmission power margin are specified by, for example, the written standard TS25.214.

A concrete receiving operation of the mobile station 1 in step ST4 is performed as follows.

When the antenna 15 receives the radio frequency signal transmitted from the base station 2, the receiving unit 51 of the physical layer control unit 14 convert the radio frequency signal into a baseband signal using a known technique.

When receiving the baseband signal from the receiving unit 51, the demodulating unit 52 of the physical layer control unit 14 demodulates the baseband signal using a known technique, and outputs the data associated with the downlink E-DPCCH to the demultiplexing unit 53.

When receiving the data associated with the downlink E-DPCCH from the demodulating unit 52, the demultiplexing unit 53 of the physical layer control unit 14 outputs the E-DPCCH data, as the information about the scheduling results, to the enhanced transmission MAC processing unit 45 of the media access control unit 13.

When receiving the scheduling result information from the base station 2, the mobile station 1 refers to the scheduling result information and transmits yet-to-be-transmitted data to the base station via the uplink DPDCH (in step ST5).

A concrete transmission operation of the mobile station 1 in step ST5 is performed as follows.

The enhanced transmission MAC processing unit 45 of the media access control unit 13 determines an amount of transmission data (or a transmission rate) which can be transmitted within the limit of the maximum transmission power margin (Max Power Margin) notified from the base station 2, and outputs yet-to-be-transmitted data to the enhanced DCH transmit buffer 46 as E-DCH data.

At this time, the enhanced transmission MAC processing part 45 controls the output timing at which the yet-to-be-transmitted data is outputted to the enhanced DCH transmit buffer 46 so that the yet-to-be-transmitted data can be transmitted to the base station at the timing specified from the scheduling result information (MAP).

The E-DCH data stored in the enhanced DCH transmit buffer 46 is outputted to the multiplexing unit 54 of the physical layer control unit 14.

On the other hand, data associated with the logical channel (DCCH) for control is, as DCH data, stored in the transmit DCH buffer 44, and is further outputted from the transmit DCH buffer 44 to the multiplexing unit 54 of the physical layer control unit 14.

The multiplexing unit 54 of the physical layer control unit 14 multiplexes the E-DCH data outputted from the enhanced DCH transmit buffer 46, and the DCH data outputted from the transmit DCH buffer 44 onto the uplink DPDCH using a known technique.

The modulating unit 55 of the physical layer control unit 14 modulates the data associated with the uplink DPDCH which are obtained by the multiplexing unit 54 using a known technique, and outputs them to the transmitting unit 56 as a transmission baseband signal.

The transmitting unit 56 of the physical layer control unit 14 converts the transmission baseband signal outputted from the modulating unit 55 into a radio frequency signal using a known technique, and transmits the radio frequency signal to the base station 2 by way of the antenna 15.

A concrete receiving operation of the base station 2 in step ST5 is performed as follows.

When the antenna 105 receives the radio frequency signal transmitted from the mobile station 1, the receiving unit 121 of the physical layer control unit 104 converts the radio frequency signal into a baseband signal using a known technique.

When receiving the baseband signal from the receiving unit 121, the demodulating unit 122 of the physical layer control unit 104 demodulates the baseband signal using a known technique to extract the data associated with the uplink DPDCH form the baseband signal, and outputs the data associated with the uplink DPDCH to the demultiplexing unit 123.

When receiving the uplink DPDCH data from the demodulating unit 122, the demultiplexing unit 123 of the physical layer control unit 104 demultiplexes the DPDCH data into the E-DCH data and DCH data.

The demultiplexing unit 123 also examines the E-DCH data so as to determine whether the reception of the E-DCH data has been correctly performed, and, when the reception determination result indicates O.K., outputs ACK to the scheduler 116 and also outputs the E-DCH data to the enhanced DCH receive buffer 112.

The enhanced DCH receive buffer 112 outputs the E-DCH data outputted from the demultiplexing unit 123 to the upper layer block unit 101 by way of the radio link control unit 102.

When the reception determination result of the E-DCH data indicates NG, the demultiplexing unit 123 outputs NACK to the scheduler 116 and discards the E-DCH data.

The DCH data separated by the demultiplexing unit 123 of the physical layer control unit 104 is outputted to the radio link control unit 102 by way of the receive DCH buffer 111 and data demultiplexing unit 113.

The base station 2 notifies the reception determination result (ACK/NACK) of the E-DCH data to the mobile station 1 via the downlink E-DPCCH (in step ST6).

A concrete transmission operation of the base station 2 in step ST6 is performed as follows.

The demultiplexing unit 123 of the physical layer control unit 104 outputs the reception determination result (ACK/NACK) of the E-DCH data to the scheduler 116.

When receiving the reception determination result (ACK/NACK) of the E-DCH data from the demultiplexing unit 123, the scheduler 116 outputs the reception determination result (ACK/NACK) to the multiplexing unit 124 of the physical layer control unit 104 as data associated with the downlink E-DPCCH.

The multiplexing unit 124 of the physical layer control unit 104 multiplexes the downlink E-DPCCH data outputted from the scheduler 116 onto the downlink E-DPCCH using a known technique.

The modulating unit 125 of the physical layer control unit 104 modulates the E-DPCCH data which is multiplexed onto the downlink E-DPCCH by the multiplexing unit 124 using a known technique, and outputs the modulated data to the transmitting unit 126 as a transmission baseband signal.

The transmitting unit 126 of the physical layer control unit 104 converts the transmission baseband signal outputted from the modulating unit 125 into a radio frequency signal using a known technique, and transmits the radio frequency signal to the mobile station 1 by way of the antenna 105.

A concrete receiving operation of the mobile station 1 in step ST6 is performed as follows.

When the antenna 15 receives the radio frequency signal transmitted from the base station 2, the receiving unit 51 of the physical layer control unit 14 converts the radio frequency signal into a baseband signal using a known technique.

When receiving the baseband signal from the receiving unit 51, the demodulating unit 52 of the physical layer control unit 14 demodulates the baseband signal using a known technique so as to output the data associated with the downlink E-DPCCH to the demultiplexing unit 53.

When receiving the data associated with the downlink E-DPCCH from the demodulating unit 52, the demultiplexing unit 53 of the physical layer control unit 14 outputs the E-DPCCH data to the enhanced transmission MAC processing unit 45 of the media access control unit 13.

When receiving the E-DPCCH data indicating the reception determination result (ACK/NACK) of the E-DCH data from the demultiplexing unit 53, the enhanced transmission MAC processing unit 45 of the media access control unit 13 analyzes the reception determination result (ACK/NACK) so as to determine whether to resend packet data or transmit packet data newly, and outputs the packet data to the enhanced DCH transmit buffer 46.

The enhanced DCH transmit buffer 46 outputs, as E-DCH data, the data outputted from the enhanced transmission MAC processing unit 45 to the multiplexing unit 54 of the physical layer control unit 14.

The multiplexing unit 54 of the physical layer control unit 14 multiplexes the E-DCH data outputted from the enhanced DCH transmit buffer 46 onto the uplink DPDCH using a known technique.

The modulating unit 55 of the physical layer control unit 14 modulates the data which is multiplexed onto the uplink DPDCH by the multiplexing unit 54 using a known technique, and outputs the modulated data to the transmitting unit 56 as a transmission baseband signal.

The transmitting unit 56 of the physical layer control unit 14 converts the transmission baseband signal outputted from the modulating unit 55 into a radio frequency signal using a known technique, and transmits the radio frequency signal (Data) to the base station 2 by way of the antenna 15.

As mentioned above, the amount-of-data information about the E-DCH data transmitted from the mobile station 1 to the base station 2 is analyzed and used directly by the base station 2, and the base station 2 carries out the scheduling for transmission of packet data via the uplink on the basis of the amount-of-data information using a known technique.

Figure 13:
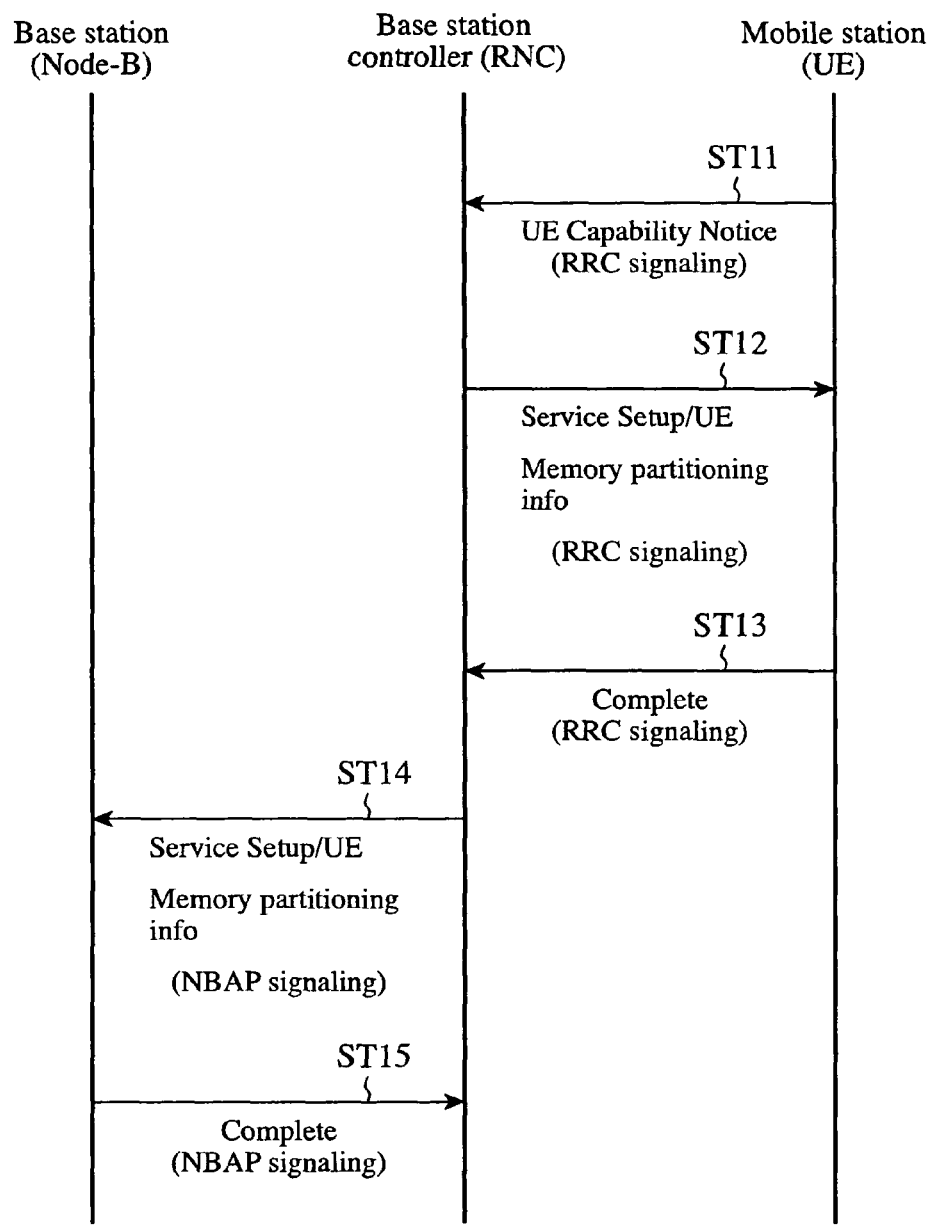
FIG. 13 is a process flow diagram showing a process flow about a notification of communication service setup information and a notification of sizing of the transmit buffers, which are transmitted between the mobile station and the base station when a plurality of communication services are carried out.

FIG. 13 is a process flow diagram showing a process flow about the notification of communication service setup information and the notification of sizing of the transmit buffers 32a, 32b, and 32c, which are transmitted between the mobile station 1 and the base station 2 when a plurality of communication services are carried out.

These notification processes are carried out prior to actual data transmission processing for the communication services or at the time of changing the communication service setups in the middle of transmission, and are carried out apart from any actual data transmission.

First, the mobile station 1 notifies, as mobile station capability (UE Capability Notice) information, memory information, such as the "total memory size of all the transmit buffers 32a, 32b, and 32c in the radio link control unit 12", the "total memory size of all the receive buffers 31a, 31b, and 31c in the radio link control unit 12", and the "total memory size of all the transmit buffers in the media access control unit 13", wireless-communications capability, such as the "maximum transmission power" and the "maximum transmission rate", to the base station controller 3 (in step ST11).

At this time, the base station 2 serves as a relay station for simple transmit and receive of radio signals and for communications of information with the base station controller 3.

Transmission and reception of various types of information between the mobile station 1 and the base station controller 3 is called RRC signaling (RRC signaling), and is specified by, for example, the written standard TS25.331.

Furthermore, the mobile station capability (UE Capability Notice) is specified by the written standard TS25.306.

In a conventional technology, RRC signaling is transmitted and received using the DCCH and DCH.

A concrete transmission operation of the mobile station 1 in step ST11 is performed as follows.

Assume that the mobile station ability information is stored in the communication capability unit 23 of the radio resource control unit 16 of the mobile station 1.

The communication capability unit 23 of the radio resource control unit 16 outputs, as control information (RLCcont), information about the "total memory size of all the transmit buffers 32*a*, 32*b*, and 32*c* in the radio link control unit 12" to the RLC control unit 33 of the radio link control unit 12.

In the radio link control unit 12, this control information (RLCcont) becomes data associated with the logical channel (DCCH) for control, and is transmitted by radio from the mobile station 1 to the base station 2 after being processed by the media access control unit 13 and physical layer control unit 14, as previously explained.

A concrete receiving operation of the base station 2 and base station controller 3 in step ST11 is performed as follows.

When the radio signal transmitted by radio from the mobile station 1 is received by the antenna 105 of the base station 2, DCH data is obtained from the radio signal after demodulation processing and so on are performed on the radio signal by the receiving unit 121, demodulating unit 122, and demultiplexing unit 123 of the physical layer control unit 104, and DCCH data is also obtained from the radio signal by the data demultiplexing unit 113 of the media access control unit 103.

The DCCH data separated by the data demultiplexing unit 113 is notified, as control information (RLCcont), to the radio resource control unit 106 by way of the radio link control unit 102 of the base station controller 3.

The base station controller 3 then notifies both setup (Service Setup) information required to carry out each communication service and mobile station transmit buffer memory partitioning (Memory partitioning) information required for each communication service to the mobile station 1 through RRC signaling (in step ST12).

This notification processing is carried out in a sequence opposite to the sequence of the notification processing for notifying the above-mentioned mobile station capability.

When receiving the above-mentioned setup information, the mobile station 1 stores the setup information in the service unit 22 of the radio resource control unit 16, and provides an instruction to each unit disposed in the mobile station so as to make configuration settings (Configration or Reconfiguration) on the mobile station.

Next, the radio resource control unit 16 of the mobile station 1 notifies completion information (Complete) indicating that the above-mentioned setup information has been reflected in each unit disposed in the mobile station to the base station controller 3 by way of the base station 2 (in step ST13).

Since the notification operation is the same as the above-mentioned notification processing for notifying the mobile station capability, the explanation of the notification operation will be omitted.

Next, the base station controller 3 notifies the setup information required to carry out each communication service, and mobile station receiving buffer memory partitioning information required for each communication service to the base station 2 (in step ST14).

Here, transmission and reception of information between the base station 2 and the base station controller 3 is called NBAP signaling (NBAP signaling), and is specified by, for example, the written standard TS25.423 and TS25.433. NBAP signaling information is transmitted via cable communications using a cable, such as a coaxial cable.

The above-mentioned information is notified from the radio resource control unit 106 of the base station controller 3 to the radio link control unit 102 and media access control unit 103.

Finally, the media access control unit 103 of the base station 2 notifies, as control information (MACcont), the completion information (Complete) indicating that the setup information has been reflected in each unit disposed in the base station to the radio resource control unit 106 of the base station controller 3 (in step ST15).

Transmission and reception of the above-mentioned information between the mobile station 1 and the base station controller 3 can be carried out independently of the transmission and reception of the above-mentioned information between the base station 2 and the base station controller 3.

Next, a variant of the transmission and reception of the setup information will be explained.

Figure 14:
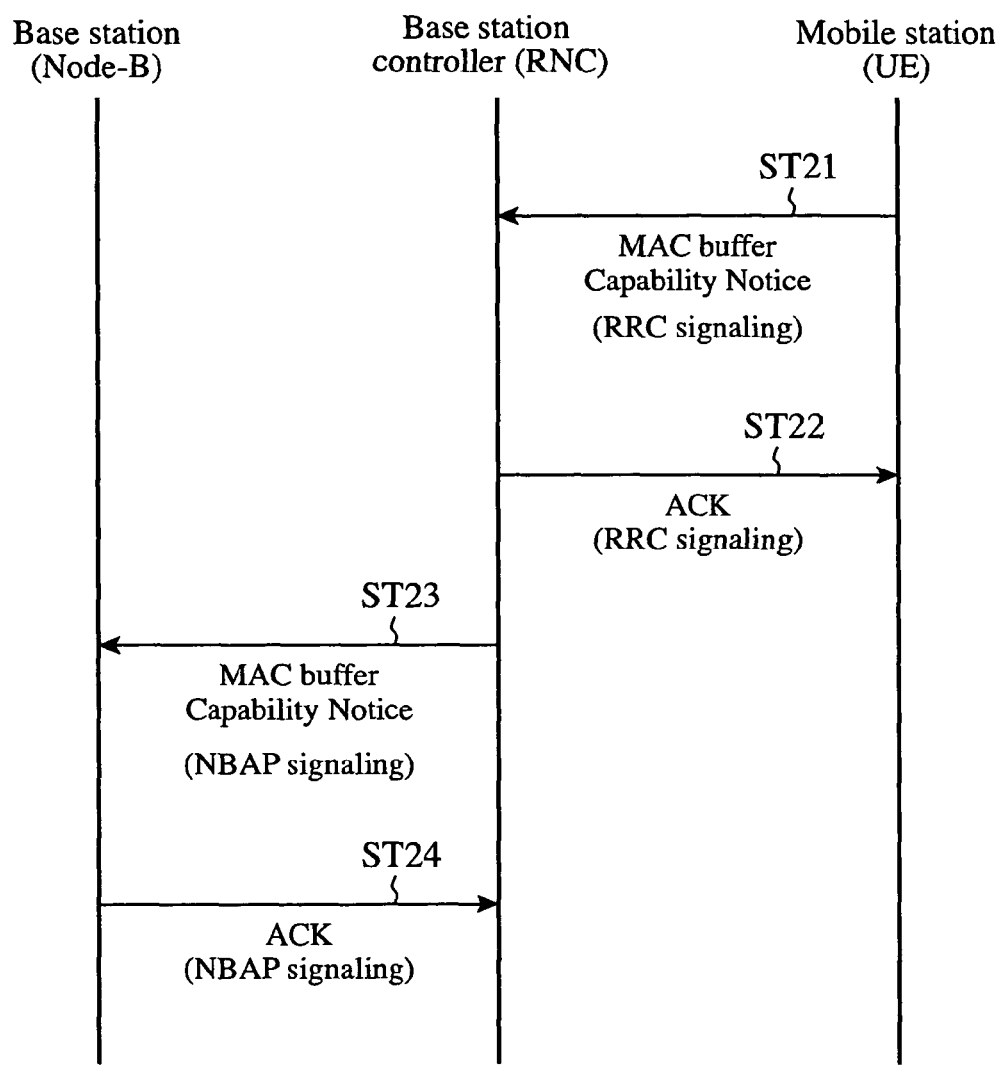
FIG. 14 is a process flow diagram showing transmission and reception intended for a case where only total memory size information about the total memory size of all the transmit buffers in the radio link control unit is notified, as one mobile station capability (UE Capability Notice) information, from the base station to the base station controller.

FIG. 14 is a process flow diagram showing transmission and reception intended for a case where only total memory size information about the total memory size of all the transmit buffers in the radio link control unit is notified, as one mobile station capability (UE Capability Notice) information, from the base station 2 to the base station controller 3.

First, the mobile station 1 notifies the mobile station ability information to the base station controller 3 in the same way that it does in the case of FIG. 13 (in step ST21).

The base station controller 3 then notifies reception information (ACK) to the mobile station 1 through RRC signaling (in step ST22).

The base station controller 3 further notifies the mobile station ability information to the base station 2 through NBAP signaling (in step ST23).

The base station 2 then notifies the reception information (ACK) to the base station controller 3 through NBAP signaling (in step ST24).

Since the operation in each signaling is the same as that in the case of FIG. 13, the explanation of the operation in each signaling will be omitted hereafter.

As can be seen from the above description, in accordance with this embodiment 1, the mobile station 1 notifies the amount-of-data information about the amount of yet-to-be-transmitted data which is calculated on a packet-communication-service-by-packet-communication-service basis or for each of logical channels for transmission of packets which are to be transmitted as E-DCH data (or combination information about a combination of the amounts of yet-to-be-transmitted data) to the base station through base-station-terminated-communications, while notifying the amount-of-data information to the base station controller 3 using RRC signaling. Therefore, since the communication system of this embodiment can support two or more simultaneous communication services which comply with the W-CDMA standard, the uplink packet transmission control (uplink radio resource control) can be carried out by the base station 2 more efficiently and the throughput of the whole cell can be improved.

When an index (Index) indicating a combination of two or more pieces of amount-of-data information is used, the number of bits required for transmission can be reduced and therefore the amount of reduction (overhead) in the transmission rate due to signaling can be reduced.

In addition, since the amount-of-data information is transmitted from the mobile station 1 directly to the base station 2, not by way of the base station controller 3, the transmission of the amount-of-data information can be carried out at a high rate and at a high frequency. Therefore, the control of the transmission by the mobile station 1 (uplink radio resource control) can be carried out by the base station 2 more efficiently and the throughput of the whole cell can be improved.

In above-mentioned embodiment 1, the maximum transmission power margin (Max power margin) and transmission timing (MAP) are notified, as the scheduling result information, from the base station 2 to the mobile station 1. As an alternative, the communication system can carry out the transmission control in the form of control of the amount of data which are permitted to be transmitted using the same format as the amount-of-data information used for making a request for assignment of the radio resources.

Embodiment 2

FIG. 15A is an explanatory diagram showing an example of amount-of-data information about the amount of data of buffers which is calculated on a communication-service-by-communication-service basis, and indexes each of which is provided for a combination of two pieces of amount-of-data information, and FIG. 15B is an explanatory diagram showing an example of amount-of-data information which is calculated for each of the transmit buffers 32a and 32b of the radio link control unit 12, and indexes each of which is provided for a combination of two pieces of amount-of-data information.

In the figures, the amount-of-data information about the amount of data stored in each buffer is expressed as "amount-of-data/guaranteed-bit-rate" (unit: sec).

FIG. 16 is an explanatory diagram showing quality of service (QoS: Quality of Service) which is obtained for each type (Class) of communication service in order to allow the notification of the amount-of-data information about the amount of data in the form of "amount-of-data/guaranteed-bit-rate" (unit: sec). QoS is specified in the written standard TS23.107. In the written standards, the above-mentioned guaranteed bit rate is defined as GBR (Guaranteed Bit Rate).

When a certain communication service is carried out, which QoS class (class) is selected or with which QoS class communications are carried out is determined when the setup information as explained with reference to FIG. 13 is transmitted between the radio resource control unit 16 of the mobile station 1 and the radio resource control unit 106 of the base station controller 3.

After a class (class) required in order to satisfy QoS is selected for each communication service, the setup information is stored in the service unit 22 of the mobile station 1 and is notified from the radio resource control unit 16 to the radio link control unit 12, media access control unit 13, and physical layer control unit 14 if needed.

The amount-of-data information calculating unit 47 of the mobile station 1 calculates a maximum time (sec) required for data transmission from both the amount-of-data information (bit) about the amount of data of each buffer notified from the radio link control unit 12 and the guaranteed bit rate (bit/sec) value of the QoS information notified from the radio resource control unit 16.

This calculation result is sent out, as amount-of-data information (TRbuffer), onto a part of the channel information associated with the uplink E-DPCCH when a request for assignment of the radio resources for uplink is made so that the calculation result is notified from the mobile station 1 to the base station 2.

The scheduler 116 of the base station 2 refers to the amount-of-data information (TRbuffer), and assigns radio resources to each mobile station 1.

Since the other operations of the communication system of this embodiment are the same as those of above-mentioned embodiment 1, the explanation of the other operations of the communication system of this embodiment will be omitted hereafter.

As can be seen from the above description, in accordance with this embodiment 2, the mobile station 1 notifies the amount-of-data information about the amount of yet-to-be-transmitted data which is calculated on a packet-communication-service-by-packet-communication-service basis or for each of logical channels for transmission of packets which are to be transmitted as E-DCH data (or combination information about a combination of the amounts of yet-to-be-transmitted data) to the base station through base-station-terminated-communications, while notifying the amount-of-data information to the base station controller 3 using RRC signaling. Therefore, since the communication system of this embodiment can support two or more simultaneous communication services which comply with the W-CDMA standard, the uplink packet transmission control (uplink radio resource control) can be carried out by the base station 2 more efficiently and the throughput of the whole cell can be improved.

When an index (Index) indicating a combination of two or more pieces of amount-of-data information is used, the number of bits required for transmission can be reduced and therefore the amount of reduction (overhead) in the transmission rate due to signaling can be reduced.

In addition, since the amount-of-data information is transmitted from the mobile station 1 directly to the base station 2, not by way of the base station controller 3, the transmission of the amount-of-data information can be carried out at a high rate and at a high frequency. Therefore, the control of the transmission by the mobile station 1 (uplink radio resource control) can be carried out by the base station 2 more efficiently and the throughput of the whole cell can be improved.

Furthermore, since the "maximum time (sec) required for transmission of yet-to-be-transmitted data at a certain time" is notified to the base station 2, the base station 2 can estimate a maximum delay which occurs in communication services by a certain mobile station 1 directly, and therefore can carry out scheduling more efficiently.

In this case, since a numerical value range required for expression of the amount of data and the number of steps (steps) required to calculate the amount of data are reduced, as compared with the case where the amount of data is directly expressed as the number of bits, the number of bits required at the time of radio transmission can be reduced, and the amount of reduction in the transmission rate (overhead) due to signaling can be further reduced.

In addition, although not defined in the conventional QoS specifications, since a guaranteed bit rate (Guaranteed bit rate) value is defined also for Interactive class and Background class each of which handles packet data at a high frequency, all the communication services can be handled in a unified way and the scheduler 116 of the base station 2 can be simplified.

In accordance with this embodiment 2, a GBR value is defined for each of Interactive class and Background class for which no GBR value is defined in any GBR column of the conventional specifications.

However, in consideration of backward compatibility (Backward compatibility) with the mobile station 1 and base station 2 which are based on the specifications of a predecessor (prior release) of the conventional written standards, new GBR specifications can be provided independently to all the classes. The method of defining a GBR value for each of Interactive class and Background class is not limited to the above-mentioned example shown in this embodiment 2.

Figure 17:
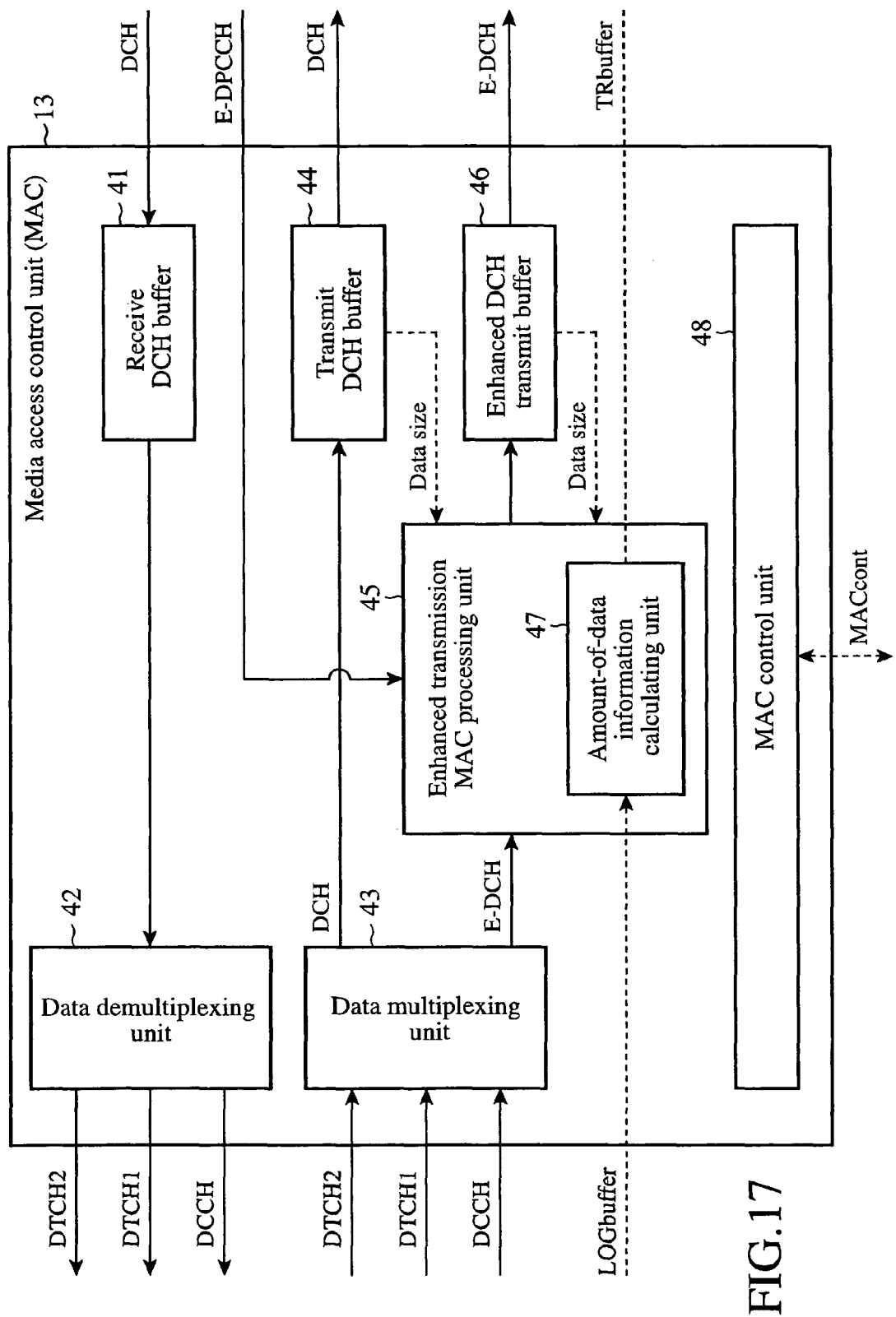
FIG. 17 is a block diagram showing the internal structure of the media access control unit of the mobile station.

Furthermore, in accordance with this embodiment 2, the amount-of-data information calculating unit 47 calculates the maximum time required for data transmission from the amount-of-data information about the amount of data of each buffer notified from the radio link control unit 12, and notifies the calculation result to the base station 2. As an alternative, the enhanced transmission MAC processing unit 45 of the media access control unit 13 can acquire the amount-of-data information (Data size) about each of the transmit DCH buffer 44 and enhanced DCH transmit buffer 46 and can use it for the calculation of the amount-of-data information (TRbuffer), as shown in FIG. 17.

Embodiment 3

FIG. 18A is an explanatory diagram showing an example of amount-of-data information about the amount of data of buffers which is obtained on a communication-service-by-communication-service basis, and indexes each of which is provided for a combination of two pieces of amount-of-data information, and FIG. 18B is an explanatory diagram showing an example of amount-of-data information which is obtained for each of the transmit buffers 32a and 32b of the radio link control unit 12, and indexes each of which is provided for a combination of two pieces of amount-of-data information.

In the figures, the amount-of-data information about the amount of data stored in each buffer is expressed as a value which is obtained by dividing the "amount-of-data/guaranteed-bit-rate" (unit: sec) by TTI which is used as a communication time unit. In this case, TTI is a unit time for transfer of data from the media access control unit 13 to the physical layer control unit 14, and 2, 10, 20, 40, or 80 msec is used, as TTI, in the conventional written standards.

Which TTI time length is selected when carrying out a certain communication service is determined at a time of exchange of the setup information explained with reference to FIG. 13 between the radio resource control unit 16 of the mobile station 1 and the radio resource control unit 106 of the base station controller 3.

After the TTI value to be used is selected for each communication service, the setup information is stored in the service unit 22 of the mobile station 1, and is then notified from the radio resource control unit 16 to the radio link control unit 12, media-access control unit 13, and physical layer control unit 14 if needed.

The amount-of-data information calculating unit 47 of the mobile station 1 calculates a maximum time (in units of TTI) required for data transmission from the amount-of-data information (bit) about each buffer notified from the radio link control unit 12, and the TTI value and the guaranteed bit rate (bit/sec) value of QoS information which are notified from the radio resource control unit 16.

This calculation result is sent out, as amount-of-data information (TRbuffer), onto a part of the channel information associated with the uplinkE-DPCCH when a request for assignment of the radio resources for uplink is made so that the calculation result is notified from the mobile station 1 to the base station 2.

The scheduler 116 of the base station 2 refers to the amount-of-data information (TRbuffer), and assigns radio resources to each mobile station 1.

Since the other operations of the communication system of this embodiment are the same as those of above-mentioned embodiment 1, the explanation of the other operations of the communication system of this embodiment will be omitted hereafter.

As mentioned above, since the amount-of-data information about the amount of data stored in each buffer is expressed in units of processing unit time, the range of numerical values required for the expression can be reduced and therefore the number of bits required for the expression can be reduced. In addition, since the amount-of-data information can be handled in a unified way that other communication processings are carried out in units of TTI, the structure of the scheduler 116 of the base station 2 can be simplified.

In this embodiment 3, the maximum transmission power margin (Max power margin) and transmission timing (MAP) are notified, as the scheduling result information, from the base station 2 to the mobile station 1. As an alternative, the communication system can carry out the transmission control in the form of control of the time which is permitted to be transmitted using the same format as the amount-of-data information used for making a request for assignment of the radio resources.

Embodiment 4

FIG. 19A is an explanatory diagram showing an example of amount-of-data information about the amount of data of buffers which is obtained on a communication-service-by-communication-service basis, and indexes each of which is provided for a combination of two pieces of amount-of-data information, and FIG. 19B is an explanatory diagram showing an example of amount-of-data information which is obtained for each of the transmit buffers 32a and 32b of the radio link control unit 12, and indexes each of which is provided for a combination of two pieces of amount-of-data information.

In the figures, the amount-of-data information about the amount of data stored in the transmit buffers of the mobile station 1 is expressed as "amount-of-data/delay (delay)" (unit: bps (bit per sec)). This delay is specified as a part of the specifications of QoS in the written standard TS23.107. In the written standard TS23.107, this delay is defined as "Transfer delay".

Which delay (QoS class (class)) is selected or which QoS class is used for communications when carrying out a certain communication service is determined at a time of exchange of the setup information explained with reference to FIG. 13 between the radio resource control unit 16 of the mobile station 1, and the radio resource control unit 106 of the base station controller 3.

After a class (class) required in order to satisfy QoS is selected for each communication service, the setup information is stored in the service unit 22 of the mobile station 1, and is then notified from the radio resource control unit 16 to the radio link control unit 12, media-access control unit 13, and physical layer control unit 14 if needed.

The amount-of-data information calculating unit 47 of the mobile station 1 calculates a minimum transmission rate (bit per sec) required to transmit data currently being stored in the buffers from the amount-of-data information (bit) about each buffer notified from the radio link control unit 12, and the delay value notified from the radio resource control unit 16.

This calculation result is sent out, as amount-of-data information (TRbuffer), onto a part of the channel information associated with the uplink E-DPCCH when a request for assignment of the radio resources for uplink is made so that the calculation result is notified from the mobile station 1 to the base station 2.

The scheduler 116 of the base station 2 refers to the amount-of-data information (TRbuffer), and assigns radio resources to each mobile station 1.

Since the other operations of the communication system of this embodiment are the same as those of above-mentioned embodiment 1, the explanation of the other operations of the communication system of this embodiment will be omitted hereafter.

FIG. 20 is an explanatory diagram showing quality of service (QoS: Quality of Service) which is provided for each type (Class) of communication service in order to enable the notification of the amount of data in the form of "amount-of-data/delay" (unit: bit per sec).

In the conventional QoS specifications, four types of communication service: Conversational class, Streaming class, Interactive class, and Background class are specified. Transfer delay (Transfer delay) is not specified in Interactive class and Background class which handle packet data in most cases.

In accordance with this embodiment 4, transfer delay (Transfer delay) is specified also in Interactive class and Background class.

As can be seen from the above description, in accordance with this embodiment 4, the mobile station 1 notifies the amount-of-data information about the amount of yet-to-be-transmitted data which is calculated on a packet-communication-service-by-packet-communication-service basis or for each of logical channels for transmission of packets which are to be transmitted as E-DCH data (or combination information about a combination of the amounts of yet-to-be-transmitted data) to the base station through base station termination communications, while notifying the amount-of-data information to the base station controller 3 using RRC signaling. Therefore, since the communication system of this embodiment can support two or more simultaneous communication services which comply with the W-CDMA standard, the uplink packet transmission control (uplink radio resource control) can be carried out by the base station 2 more efficiently and the throughput of the whole cell can be improved.

When an index (Index) indicating a combination of two or more pieces of amount-of-data information is used, the number of bits required for transmission can be reduced and therefore the amount of reduction (overhead) in the transmission rate due to signaling can be reduced.

In addition, since the amount-of-data information is transmitted from the mobile station 1 directly to the base station 2, not by way of the base station controller 3, the transmission of the amount-of-data information can be carried out at a high rate and at a high frequency. Therefore, the control of the transmission by the mobile station 1 (uplink radio resource control) can be carried out by the base station 2 more efficiently and the throughput of the whole cell can be improved.

Furthermore, since the "transmission rate (bit per sec) required for transmission of data stored in the transmit buffers of the mobile station 1" is notified to the base station 2, the base station 2 can estimate a minimum transmission rate for communication services by a certain mobile station 1 directly, and therefore can carry out scheduling more efficiently.

In this case, since a numerical value range required for expression of the amount of data and the number of steps (steps) required to calculate the amount of data are reduced, as compared with the case where the amount of data is directly expressed as the number of bits, the number of bits required at the time of radio transmission can be reduced, and the amount of reduction in the transmission rate (overhead) due to signaling can be further reduced.

In addition, although not defined in the conventional QoS specifications, since a minimum transmission rate (bit per sec) value is defined also for Interactive class and Background class each of which handles packet data at a high frequency, all the communication services can be handled in a unified way and the scheduler 116 of the base station 2 can be simplified.

In accordance with this embodiment 4, a delay value is defined for each of Interactive class and Background class for which no delay (Transfer delay) value is defined in the QoS specifications of the conventional standards.

However, in consideration of backward compatibility (Backward compatibility) with the mobile station 1 and base station 2 which are based on the specifications of a predecessor (prior release) of the conventional written standards, new delay specifications can be provided independently to all the classes. The method of defining a delay value for each of Interactive class and Background class is not limited to the above-mentioned example shown in this embodiment 4.

Furthermore, in accordance with this embodiment 4, the amount-of-data information calculating unit 47 calculates the transmission rate required for data transmission from the amount-of-data information about the amount of data of each buffer notified from the radio link control unit 12, and notifies the calculation result to the base station 2. As an alternative, the enhanced transmission MAC processing unit 45 of the media access control unit 13 can acquire the amount-of-data information (Data size) about each of the transmit DCH buffer 44 and enhanced DCH transmit buffer 46 and can use it for the calculation of the amount-of-data information (TR-buffer), as shown in FIG. 17.

In this embodiment 4, the maximum transmission power margin (Max power margin) and transmission timing (MAP) are notified, as the scheduling result information, from the base station 2 to the mobile station 1. As an alternative, the communication system can carry out the transmission control in the form of control of the transmission rate of data which are permitted to be transmitted using the same format as the amount-of-data information used for making a request for assignment of the radio resources.

Embodiment 5

Before explaining this embodiment 5, TFCI (Transport Format Combination Indicatot) in the conventional standards will be explained.

Transport Format Combination is an index (Index) used to notify a combination of transmission rates which transport channels which are multiplexed into a physical data channel (DPDCH) have (in the written standards, at which transmission rate of one transport channel which is multiplexed into a physical data channel is called Transport Format) when two or more logical channels are established for communications between the mobile station 1 and the base station 2.

The combination of transmission rates which the logical channels can have is determined at a time of exchange of the setup information explained with reference to FIG. 13 between the radio resource control unit 16 of the mobile station 1, and the radio resource control unit 106 of the base station controller 3.

Both the base station 2 and the mobile station 1 have the same TFC information (TFCI) in advance.

In the conventional standards, there is provided one and only uplink transport channel DCH.

When the transmission control of the E-DCH is completely carried out independently of the transmission control of the DCH, information similar to the TFC information is independently set up for the E-DCH and is notified at the time of data transmission. However, since it is unnecessary to provide an explanation about the transmission control of the E-DCH in the present invention, no explanation about the transmission control of the E-DCH will be made hereafter.

For the E-DCH, TFC (or TFCI) specifications are added to the written standards, like those for the DCH.

Hereafter, a case where the mobile station 1 transmits TFC information to the base station 2 will be explained. The same explanation is given even in a case where transmission of TFC information is carried out in a direction opposite to that in the above case.

TFC information which is set up in advance is stored in the service unit 22 of the mobile station 1, and is notified from the radio resource control unit 16 to the radio link control unit 12, media-access control unit 13, and physical layer control unit 14 if needed.

Similarly, information about a multiplexing setup of communication services via logical channels and so on is also set up when the notification of the TFC information is carried out, and is stored in the service unit 22. The multiplexing setup information is then notified from the radio resource control unit 16 to the radio link control unit 12, media-access control unit 13, and physical layer control unit 14 if needed.

The media-access control unit 13 selects a TFC which defines a transmission rate at which the mobile station transmits data to the base station at a certain transmission time (in the written standards, the selection is defined as TFC selection (TFC Selection)), and, after that, the mobile station transmits data having an amount specified through the TFC selection to the base station 2 by radio. When data is transmitted to the base station by radio, the TFC information is not transmitted in the form of the TFC information itself, but is transmitted in the form of an index (TFCI). The base station 2 demodulates the uplink data on the basis of the received TFC information.

This embodiment 5 of the present invention will be now described hereafter.

FIG. 21 is an explanatory diagram showing an example of the transmission rate of the E-DCH as the amount-of-data information (TRbuffer), and the index (TFCI) of the transmission rate.

In this embodiment 5, the amount-of-data information is expressed as "amount-of-data/TTI-unit-time" (unit: bps (bit per TTI)). In this case, it is assumed that TTI is 10 ms. Furthermore, assume that a region of TFCI<=7 shows a transmission rate which is the same as the transmission rate used for the DCH, and a region of TFCI>7 shows an enhanced transmission rate in accordance with the present invention.

The TFC setup for the E-DCH which is set up at the time of the communication service setup can be also used when a request for assignment of the radio resources is received from the enhanced transmission MAC processing unit 45, and the TFC information can be sent out onto the uplink E-DPCCH and can be transmitted to the base station 2.

Hereafter, the operation of the mobile station 1 will be explained.

The amount-of-data information calculating unit 47 of the mobile station 1 calculates a transmission rate value which it requests when making a request for assignment of the radio resources from amount-of-data information (bit) about each buffer notified from the radio link control unit 12, and a delay value notified from the radio resource control unit 16.

This calculation result is sent out, as the amount-of-data information (TRbuffer), onto a part of the channel information associated with the uplink E-DPCCH when the request for assignment of the radio resources for uplink is made so that the calculation result is notified from the mobile station 1 to the base station 2.

The scheduler 116 of the base station 2 refers to the amount-of-data information (TRbuffer), and assigns radio resources to each mobile station 1.

Since the other operations of the communication system of this embodiment are the same as those of above-mentioned embodiment 1, the explanation of the other operations of the communication system of this embodiment will be omitted hereafter.

As can be seen from the above description, in accordance with this embodiment 5, the mobile station 1 notifies the amount-of-data information about the amount of yet-to-be-transmitted data which is calculated on a packet-communication-service-by-packet-communication-service basis or for each of logical channels for transmission of packets which are to be transmitted as E-DCH data (or combination information about a combination of the amounts of yet-to-be-transmitted data) to the base station through base station termination communications, while notifying the amount-of-data information to the base station controller 3 using RRC signaling. Therefore, since the communication system of this embodiment can support two or more simultaneous communication services which comply with the W-CDMA standard, the uplink packet transmission control (uplink radio resource control) can be carried out by the base station 2 more efficiently and the throughput of the whole cell can be improved.

When an index (Index) indicating a combination of two or more pieces of amount-of-data information is used, the number of bits required for transmission can be reduced and therefore the amount of reduction (overhead) in the transmission rate due to signaling can be reduced.

In addition, since the amount-of-data information is transmitted from the mobile station 1 directly to the base station 2, not by way of the base station controller 3, the transmission of the amount-of-data information can be carried out at a high rate and at a high frequency. Therefore, the control of the transmission by the mobile station 1 (uplink radio resource control) can be carried out by the base station 2 more efficiently and the throughput of the whole cell can be improved.

Furthermore, since the TFC (TFCI) specified for the E-DCH is also used as the expression of data information at the time when a request for assignment of the radio resources for uplink is made, it is not necessary to separately define specifications for the time when a request for assignment of the radio resources for uplink is made, and therefore the structure of the mobile station 1 can be simplified.

It can be considered that two or more E-DCHs are set up simultaneously. In this case, TFC used for a combination of the Transport Formats of the E-DCHs (or an index of the combination) can be used as the expression of data information at the time when a request for assignment of the radio resources for uplink is made.

Embodiment 6

FIG. 22 is an explanatory diagram showing an example of the transmission rate of the E-DCH as the amount-of-data information (TRbuffer), and the index (TFCI) of the transmission rate.

In accordance with this embodiment 6, the media-access control unit 13 and enhanced transmission MAC processing unit 45 of the mobile station 1 carry out their respective TFC selection operations in cooperation with each other.

In this embodiment 6, the mobile station transmits TFC (or TFCI) which it combines with a Transport Format which is used for the DCH and E-DCH when making a request for assignment of the radio resources for uplink to the base station 2 using the uplink E-DPCCH.

The amount-of-data information calculating unit 47 of the mobile station 1 calculates a transmission rate at which the mobile station needs to transmit data currently being stored in the buffers thereof to the base station using the E-DCH from the amount-of-data information (bit) about each buffer notified from the radio link control unit 12, and the set transmission rate for TFC notified from the radio resource control unit 16.

The mobile station 1 then acquires TFCI corresponding to the calculated transmission rate for the E-DCH and sends out this TFCI, as the amount-of-data information (TRbuf fer), onto a part of the channel information associated with the uplink E-DPCCH when making the request for assignment of the radio resources for uplink so as to notify the TFCI from the mobile station 1 to the base station 2.

The scheduler 116 of the base station 2 refers to the amount-of-data information (TRbuffer), and assigns radio resources to each mobile station 1.

Since the other operations of the communication system of this embodiment are the same as those of above-mentioned embodiment 1, the explanation of the other operations of the communication system of this embodiment will be omitted hereafter.

As mentioned above, since a combination with the transmission rate of the transport channel, which is used according to the conventional standards, can be also used, it is not necessary to separately define specifications for the time when a request for assignment of the radio resources for uplink is made, and therefore the structure of the mobile station 1 can be simplified.

In this embodiment 6, a maximum transmission power margin (Max power margin) and a transmission timing (MAP) are notified, as scheduling result information, from the base station 2 to the mobile station 1. As an alternative, the communication system can carry out transmission control in the form of control of the transmission rate of data which are permitted to be transmitted using the same format as the amount-of-data information used for making a request for assignment of the radio resources.

Embodiment 7

FIG. 23 is an explanatory diagram showing an example of a setting of a channel amplitude coefficient ($\beta$) of DPDCH, as amount-of-data information (TRbuffer), at a time when E-DCH data is transmitted, and an index of the channel amplitude coefficient.

In the conventional standards, a channel amplitude coefficient is specified for each uplink channel, and the specifications of the channel amplitude coefficient is defined in the standards TS25.213 and TS25.214. Assume that the channel amplitude coefficient of DPDCH at the time when E-DCH data is transmitted is $\beta eu$.

Figure 24:
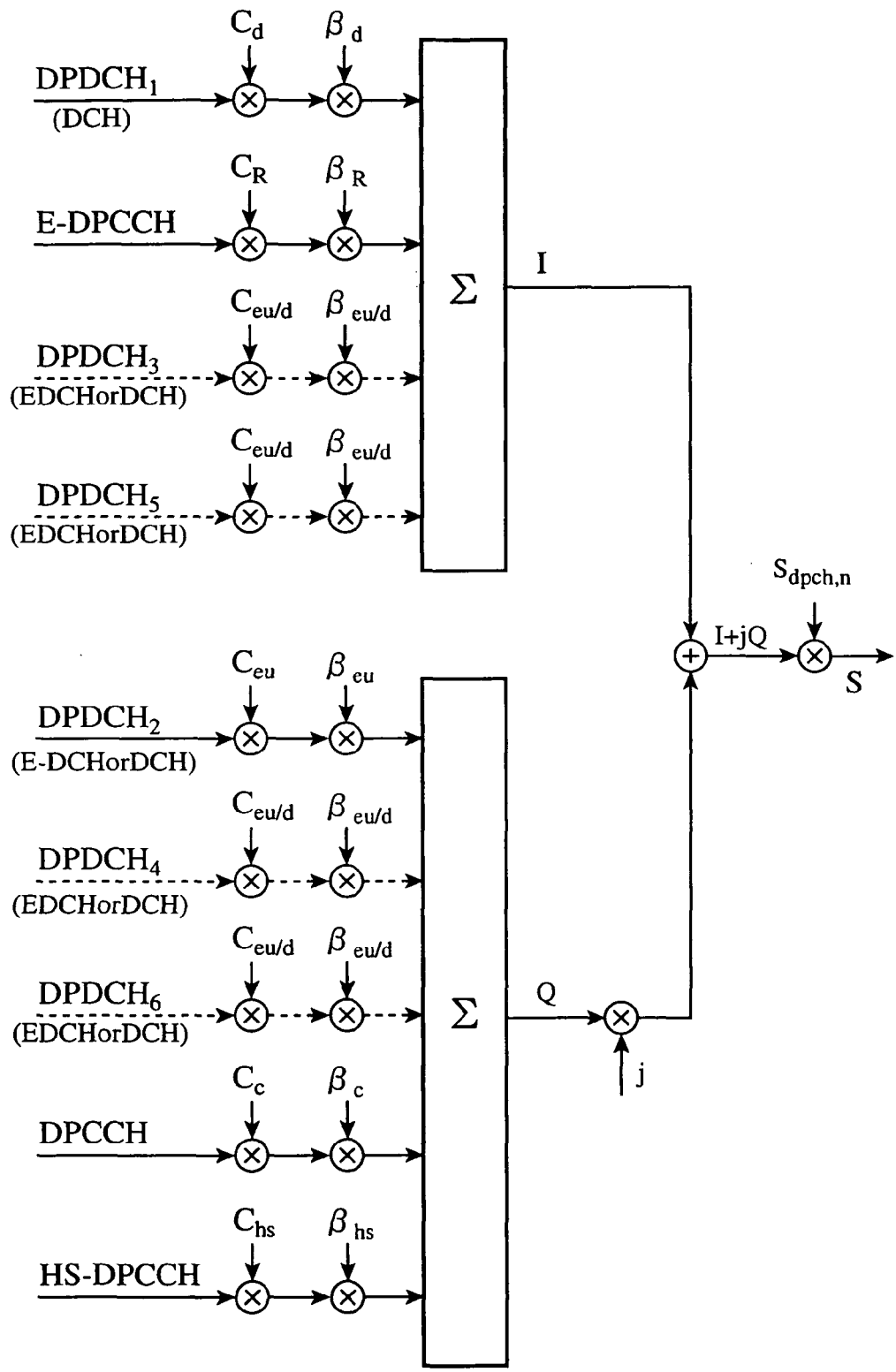
FIG. 24 is an explanatory diagram showing an example of multiplexing of a transport channel and a physical channel in a multiplexing unit of the mobile station.

In FIG. 24, an example of multiplexing of a transport channel and a physical channel in the multiplexing unit 54 of the mobile station 1 is shown in order to explain the channel amplitude coefficient $\beta eu$.

The multiplexing of each transport channel and a physical channel is specified in the written standard TS25.213, and a similar drawing showing the multiplexing of each transport channel and a physical channel is disclosed by the written standard TS25.213. The conventional standards correspond to a case where E-DCH and E-DPCCH are eliminated in FIG. 24.

In the figure, "$\beta eu/d$" means that $\beta eu$ or $\beta d$ is adopted when carrying out multiplexing of DCH data and E-DCH data into the same DPDCH with, for example, time multiplexing. Furthermore, "x" denotes multiplication, "+" and "sigma" denote addition, "j" denotes an imaginary number, "Cc" or the like denotes a spread code for channel separation, "I or Q" denotes an axis on a Gauss-Argand plane, and "Sdpch, n" denotes a code for mobile station identification.

In the figure, the existence of a plurality of DPDCHs, i.e., DPDCH1 to DPDCH6 means that the plurality of DPDCH channels are not transmitted, but one DCH or one E-DCH can be parallel-divided and transmitted using up to six spread codes.

The setting of the multiplexing of a transport channel and a physical channel in the physical layer control unit 14 is determined at a time of exchange of the setup information explained with reference to FIG. 13 between the radio resource control unit 16 of the mobile station 1, and the radio resource control unit 106 of the base station controller 3.

The multiplexing setting information is stored in the service unit 22 of the mobile station 1, and is then notified from the radio resource control unit 16 to the radio link control unit 12, media-access control unit 13, and physical layer control unit 14 if needed.

The amount-of-data information calculating unit 47 of the mobile station 1 calculates a transmission rate at which the mobile station needs to transmit data currently being stored in the buffers thereof to the base station using the E-DCH from the amount-of-data information (bit) about each buffer notified from the radio link control unit 12, and the multiplexing setting information notified from the radio resource control unit 16. This transmission rate can be a transmission rate shown in above-mentioned embodiment 4.

The mobile station 1 then acquires a channel amplitude coefficient for E-DCH transmission corresponding to the calculated transmission rate and sends out this channel amplitude coefficient for E-DCH transmission, as the amount-of-data information (TRbuffer), onto a part of the channel information associated with the uplink E-DPCCH when making a request for assignment of the radio resources for uplink so as to notify the channel amplitude coefficient from the mobile station 1 to the base station 2.

The scheduler 116 of the base station 2 refers to the amount-of-data information (TRbuffer), and assigns radio resources to each mobile station 1.

Since the other operations of the communication system of this embodiment are the same as those of above-mentioned embodiment 1, the explanation of the other operations of the communication system of this embodiment will be omitted hereafter.

There can be provided various types of methods of transmitting the channel amplitude coefficient by radio, as will be mentioned below. How to use which one of such various types of methods depends upon how the mobile station 1 is implemented, and the specifications of how to use which one of such various types of methods are defined in, for example, the written standards TS25.211 and TS25.331.

(1) An actual numeric value of the channel amplitude coefficient corresponding to the transmission rate which the mobile station requests (2) An index of the channel amplitude coefficient (3) A change in the channel amplitude coefficient (4) An index of the change in the channel amplitude coefficient (5) A ratio between channel amplitude coefficients (6) An index of the ratio between the channel amplitude coefficients In W-CDMA systems, the data transmission rate is variable, and, as the transmission rate increases, the amplitude coefficient β is increased in order to secure an S/N ratio per one transmission bit (which is so-called Eb/No). In other words, the amplitude coefficient β is determined by a transmission rate.

In W-CDMA systems, all the mobile stations 1 use the same radio frequency. Therefore, when the base station 2 receives a radio frequency signal from a specific mobile station 1, all of the reception power of radio frequency signals transmitted from other mobile stations becomes the power of interference noise.

On the other hand, the base station 2 needs to carry out scheduling for transmission of data from each mobile station 1 while monitoring the interference power, throughput, etc. of the whole cell thereof.

As previously mentioned, the amount-of-data information is sent to the base station in the form in which it can be converted directly into interference power ($\propto$ mobile station transmission power) which is caused at the data transmission rate which the mobile station requests. The amount of calculations of the scheduler 116 can be reduced, and therefore the structure of the scheduler 116 can be simplified.

Since the channel amplitude coefficient βeu shows what transmission rate is required for the DPDCH when E-DCH data is sent out onto the DPDCH, the channel amplitude coefficient βeu can be handled satisfactorily even if a plurality of communication services are used, and the scheduler 116 can be simplified.

In this embodiment 7, a channel amplitude coefficient is specified only for the E-DCH. As an alternative, a combination of the channel amplitude coefficient specified for the E-DCH and a channel amplitude coefficient βd for a conventional DCH channel can be transmitted to the base station using an uplink E-DPCCH 110.

In this embodiment 7, the mobile station uses the channel amplitude coefficient βeu only when making a request for assignment of the radio resources for uplink. It is further possible to use a gain factor setting as scheduling result information, and to use, as a maximum gain factor setting, instead of maximum transmission power margin (Max Powerr Margin) information notified using a downlink E-DPCCH.

As a result, the multiplexing unit 54 of the mobile station 1 can set up the channel amplitude coefficient βeu directly, and the structure of the mobile station 1 can be simplified.

Embodiment 8

FIG. 25 is an explanatory diagram showing an example of a setting of a transmission physical channel power offset, as amount-of-data information (TRbuffer), at a time when E-DCH data is transmitted, and an index of the transmission physical channel power offset.

The amount-of-data information calculating unit 47 of the mobile station 1 calculates a transmission rate at which the mobile station needs to transmit data currently being stored in the buffers thereof to the base station using the E-DCH from the amount-of-data information (bit) about each buffer notified from the radio link control unit 12, and channel multiplexing setting information notified from the radio resource control unit 16. This transmission rate can be a transmission rate shown in above-mentioned embodiment 4.

The mobile station 1 then acquires a channel amplitude coefficient for E-DCH transmission corresponding to this calculated transmission rate, converts the channel amplitude coefficient for E-DCH transmission into power, and further converts a gain factor βc of an uplink DPCCH into power so as to converts the power for E-DCH transmission into a power offset value which is defined with respect to the power of the uplink DPCCH.

The mobile station 1 sends out the power offset value, as the amount-of-data information (TRbuffer), onto a part of the channel information associated with the uplink E-DPCCH when making a request for assignment of the radio resources for uplink so as to notify the power offset value from the mobile station 1 to the base station 2.

The scheduler 116 of the base station 2 refers to the amount-of-data information (TRbuffer), and assigns radio resources to each mobile station 1.

Since the other operations of the communication system of this embodiment are the same as those of above-mentioned embodiment 1, the explanation of the other operations of the communication system of this embodiment will be omitted hereafter.

As previously mentioned, the amount-of-data information is sent to the base station in the form in which it can be converted directly into interference power ($\propto$ mobile station transmission power) which is caused at the transmission rate required to transmit data. The amount of calculations of the scheduler 116 can be reduced, and therefore the structure of the scheduler 116 can be simplified.

In this embodiment 8, the mobile station uses the power offset information only when making a request for assignment of the radio resources for uplink. As an alternative, it is possible to use the power offset value as scheduling result information.

Embodiment 9

In accordance with this embodiment 9, the scheduler 116 of the base station 2 does not carry out scheduling for the data transmission timing in the mobile station 1, but carries out scheduling for the uplink data transmission rate. The mobile station 1, base station 2, and base station controller 3 have the same internal structures as those of above-mentioned embodiment 1.

FIG. 26 is a transmission flow diagram showing a transmission flow of packet data (E-DCH) in the uplink.

In accordance with above-mentioned embodiment 1, as shown in FIG. 11, packet data (E-DCH) are transmitted mainly in the following 4 steps:

(1) The mobile station 1 transmits a request for assignment of the radio resources for uplink to the base station 2.

(2) The base station 2 transmits scheduling result information to the mobile station 1.

(3) The mobile station 1 transmits packet data to the base station 2.

(4) The base station 2 transmits a result of determination of reception of the packet data to the mobile station 1.

On the other hand, in this embodiment 9, as shown in FIG. 26, above-mentioned (1) and (2), and (3) and (4) are divided into a radio resource control flow (A) and a data transmission flow (B).

In this case, the mobile station 1 transmits a request for permission to increase or decrease the transmission rate at a time of transmission of data (in the figure, the request is referred to as Rate Request) as a request for assignment of the radio resources (in the above-mentioned processing (1)), and the base station 2 transmits information indicating whether or not the mobile station is granted permission to increase or decrease the transmission rate (in the figure, the information is referred to as Rate Grant) as a notification of the scheduling result (in the above-mentioned processing (2)). Therefore, in the data transmission (in the above-mentioned processing (3)) by the mobile station 1, the transmission timing is determined by judgment of the mobile station 1 (the data transmission is so-called autonomous transmission control (Autonomous Transmission)).

When receiving data from the mobile station 1, the base station 2 notifies a result of determination of reception of the data (in the above-mentioned processing (4)) to the mobile station 1.

Hereafter, the radio resource control flow will be explained with reference to FIG. 26A.

First, the mobile station 1 measures the amount of yet-to-be-transmitted data (in step ST101).

In other words, data associated with a service 1 (Service1) and a service 2 (Service2) which are generated in the upper layer block unit 11 of the mobile station 1 are stored in the transmit buffers 32a and 32b of the radio link control unit 12 as transmission data (TX DATA1 and TX DATA2), respectively, and are outputted, as data associated with the logical channels for transmission (DTCH1 and DTCH2), from the transmit buffers 32a and 32b to the data multiplexing unit 43 of the media-access control unit 13, respectively.

Various types of mobile station control information about the transmission of data associated with the service 1 from the service unit 22 of the radio resource control unit 16 are stored, as control information (RLCont), in the transmit buffer 32c by way of the RRC control unit 21, and are further outputted, as a logical channel (DCCH) for control, from the transmit buffer 32c to the data multiplexing unit 43 of the media-access control unit 13.

At this time, each of the transmit buffers 32a, 32b, and 32c of the radio link control unit 12 outputs data size information (Data size) about the amount of data stored therein to the buffer monitoring unit 34 at predetermined intervals or when the amount of data varies.

The buffer monitoring unit 34 of the radio link control unit 12 outputs the three pieces of data size information outputted from the transmit buffers 32a, 32b, and 32c as amount-of-data information (LOGbuffer) to the amount-of-data information calculating unit 47 of the media-access control unit 13.

The mobile station 1 then notifies an uplink E-DPCCH to the base station 2 in order to make a request for permission to increase or decrease the uplink transmission rate (in step ST102).

A concrete transmission operation of the mobile station 1 in step ST102 is performed as follows.

When receiving the amount-of-data information (LOGbuffer) from the buffer monitoring unit 34, the amount-of-data information calculating unit 47 of the media-access control unit 13 calculates the amount of data for each of the communication services (i.e., the amount of data for the service 1 and the amount of data for the service 2) on the basis of the amount-of-data information (LOGbuffer). As an alternative, the amount-of-data information calculating unit 47 calculates the amount of data for each of the logical channels for data transmission (i.e., the amount of data for DTCH1 and the amount of data for DTCH2) which are included in the logical channels currently being assigned to the E-DCH.

The amount-of-data information calculating unit 47 then calculates a transmission rate which it makes a request of the scheduler 116 to set from changes in the amounts of data. There can be the following methods as a method of calculating the transmission rate which the mobile station makes a request of the scheduler to set.

(1) A method of using the transmission rate determined in above-mentioned embodiment 4

(2) A method of monitoring the status of transmission of DCH data using the PHY control unit 57, and calculating the transmission rate so that a transmission rate at which the sum of the DCH data and E-DCH data is transmitted does not exceed a given set value.

The amount-of-data information calculating unit 47 of the media-access control unit 13 determines whether or not there is a need to increase or decrease the transmission rate from changes in the amounts of data, acquires a channel amplitude coefficient for E-DCH transmission corresponding to the transmission rate, and sends out this channel amplitude coefficient for E-DCH transmission, as the amount-of-data information (TRbuffer), onto a part of the channel information associated with the uplink E-DPCCH when making a request for assignment of the radio resources for uplink so as to notify the channel amplitude coefficient from the mobile station 1 to the base station 2.

Since the above-mentioned radio transmission operation of the media-access control unit 13 and physical layer control unit 14 is the same as that explained in either of above-mentioned embodiments, the explanation of the details of the above-mentioned radio transmission operations will be omitted hereafter.

There can be provided various types of methods of transmitting the channel amplitude coefficient by radio, as will be mentioned below. How to use which one of such various types of methods depends upon how the mobile station 1 is implemented, and the specifications of how to use which one of such various types of methods are defined in, for example, the written standards TS25.211 and TS25.331.

(1) An actual numeric value of the channel amplitude coefficient corresponding to the transmission rate which the mobile station requests (2) An index of the channel amplitude coefficient (3) A change in the channel amplitude coefficient (Up/Down)

(4) An index of the change in the channel amplitude coefficient (5) A square value of the channel amplitude coefficient (converted into a power dimension)

(6) An index of the square value (converted into a power dimension) of the channel amplitude coefficient (7) A ratio between channel amplitude coefficients (8) An index of the ratio between the channel amplitude coefficients (9) A ratio (power offset) between square values (converted into a power dimension) of channel amplitude coefficients

(10) An index of the power offset

A concrete receiving operation of the base station 2 in step ST102 is performed as follows.

When the antenna 105 receives a radio frequency signal transmitted from the mobile station 1, the receiving unit 121 of the physical layer control unit 104 converts the radio frequency signal into a baseband signal using a known technique.

When receiving the baseband signal from the receiving unit 121, the demodulating unit 122 of the physical layer control unit 104 demodulates the baseband signal using a known technique to extract data associated with the uplink E-DPCCH form the baseband signal, and outputs the data associated with the uplink E-DPCCH to the demultiplexing unit 123.

When receiving the data associated with the uplink E-DPCCH from the demodulating unit 122, the demultiplexing unit 123 of the physical layer control unit 104 outputs the E-DPCCH data to the scheduler 116 of the media-access control unit 103.

When receiving the E-DPCCH data from the physical layer control unit 104, the scheduler 116 of the media-access control unit 103 performs control (scheduling) of assignment of the radio resources for uplink to each mobile station 1 on the basis of the E-DPCCH data, and determines whether to grant the request for permission to increase or decrease the transmission rate which the mobile station 1 has made (in step ST103).

As an algorithm used for the scheduling, various types of methods shown in above-mentioned embodiment 1 can be used. In the design of the base station 2 and communication system of this embodiment, the algorithm is designed and selected so that the throughput of the whole cell can be maximized.

The base station 2 then notifies information about the scheduling result to the mobile station 1 using the downlink E-DPCCH (in step ST104).

A concrete transmission operation of the base station 2 in step ST104 is performed as follows.

The scheduler 116 of the base station 2 outputs, as downlink E-DPCCH data, information (Rate Grant) indicating whether or not the mobile station is granted permission to increase or decrease the transmission rate, which is the information about the scheduling result, to the multiplexing unit 124 of the physical layer control unit 104.

The multiplexing unit 124 of the physical layer control unit 104 multiplexes the downlink E-DPCCH data outputted from the scheduler 116 onto the downlink E-DPCCH using a known technique.

The modulating unit 125 of the physical layer control unit 104 modulates the E-DPCCH data which is multiplexed onto the downlink E-DPCCH by the multiplexing unit 124 using a known technique, and outputs the modulated data to the transmitting unit 126 as a transmission baseband signal.

The transmitting unit 126 of the physical layer control unit 104 converts the transmission baseband signal outputted from the modulating unit 125 into a radio frequency signal using a known technique, and transmits the radio frequency signal to the mobile station 1 by way of the antenna 105.

There can be provided various types of methods of transmitting the information (Rate Grant) indicating whether or not the mobile station is granted permission to increase or decrease the transmission rate, which is the information about the scheduling result, as will be mentioned below. How to use which one of such various types of methods depends upon how the base station 2 is implemented, and the specifications of how to use which one of such various types of methods are defined in the written standard TS25.331.

(1) An actual numeric value of the channel amplitude coefficient corresponding to the transmission rate which the base station grants (2) An index of the channel amplitude coefficient (3) A change in the channel amplitude coefficient (Up/Down)

(4) An index of the change in the channel amplitude coefficient (5) A square value of the channel amplitude coefficient (converted into a power dimension)

(6) An index of the square value (converted into a power dimension) of the channel amplitude coefficient (7) A ratio between channel amplitude coefficients (8) An index of the ratio between the channel amplitude coefficients (9) A ratio (power offset) between square values (converted into a power dimension) of channel amplitude coefficients

(10) An index of the power offset

A concrete receiving operation of the mobile station 1 in step ST104 is performed as follows.

When the antenna 15 receives the radio frequency signal transmitted from the base station 2, the receiving unit 51 of the physical layer control unit 14 converts the radio frequency signal into a baseband signal using a known technique.

When receiving the baseband signal from the receiving unit 51, the demodulating unit 52 of the physical layer control unit 14 demodulates the baseband signal using a known technique so as to output the data associated with the downlink E-DPCCH to the demultiplexing unit 53.

When receiving the data associated with the downlink E-DPCCH from the demodulating unit 52, the demultiplexing unit 53 of the physical layer control unit 14 outputs the E-DPCCH data, as the information indicating whether or not the mobile station is granted permission to increase or decrease the transmission rate, which is the information about the scheduling result, to the enhanced transmission MAC processing unit 45 of the media-access control unit 13.

When receiving the information indicating whether or not the mobile station is granted permission to increase or decrease the transmission rate from the demultiplexing unit 53, the enhanced transmission MAC processing unit 45 of the media-access control unit 13 refers to the information indicating whether or not the mobile station is granted permission to increase or decrease the transmission rate, and updates an available maximum transmission rate value.

In the above-mentioned way, the monitoring of the amounts of data of the transmit buffers of the mobile station 1, the determination of whether to make a request for permission to increase or decrease the transmission rate, and the transmission of the request for permission to increase or decrease the transmission rate to the base station 2 in the enhanced transmission MAC processing unit 45, the determination of the transmission rate in the scheduler 116 of the base station 2, and the notification of the scheduling result from the base station 2 are repeatedly carried out (in steps ST101 to ST104).

Hereafter, the data transmission flow (B) will be explained with reference to FIG. 26B.

Figure 26A:
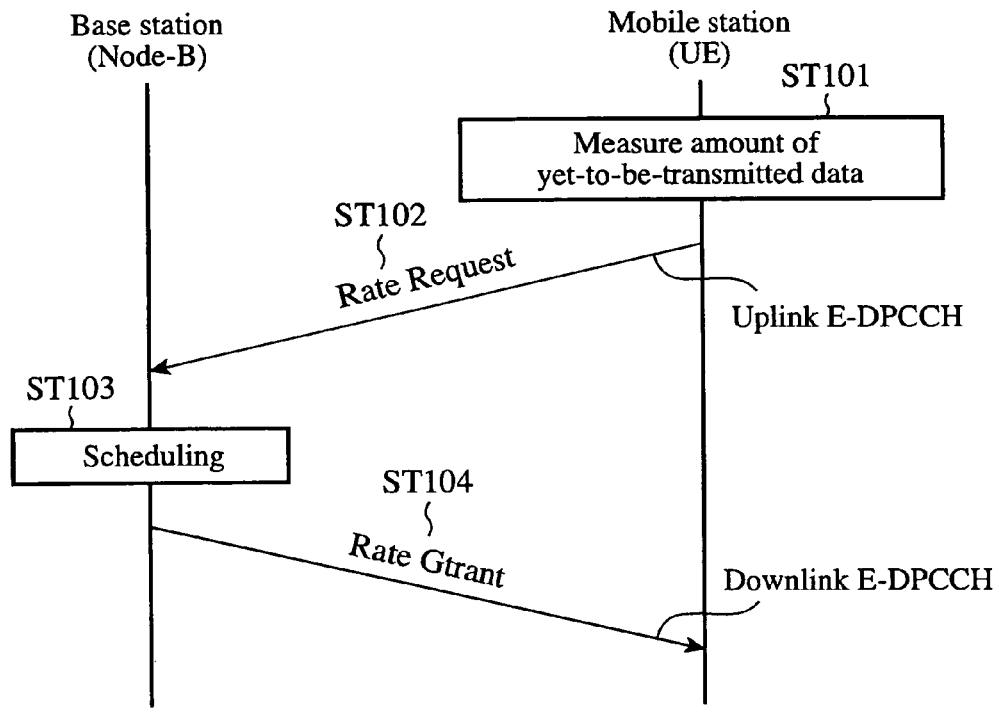
FIG. 26 is a transmission flow diagram showing a transmission flow of packet data (E-DCH) in an uplink.
Figure 26B:
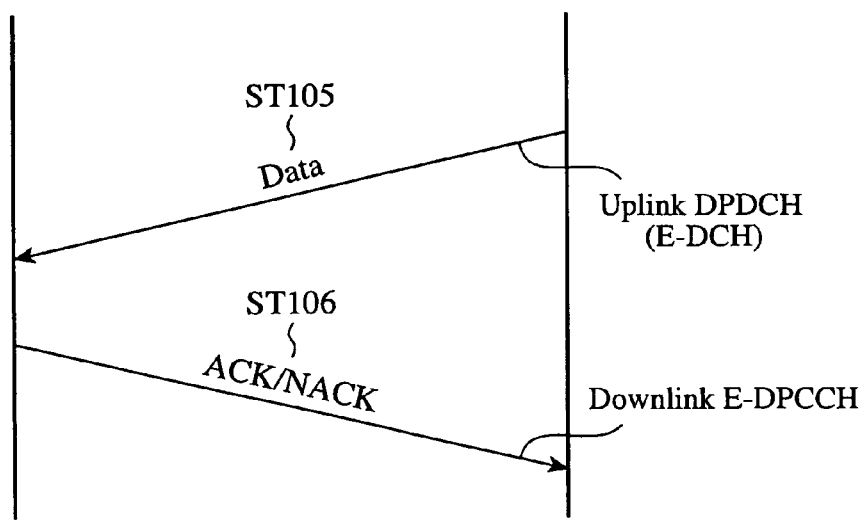

First, the mobile station 1 transmits data autonomously at a transmission rate which does not exceed the available maximum transmission rate properly updated according to the flow of FIG. 26A (in step ST105).

A concrete transmission operation of the mobile station 1 in step ST105 is performed as follows.

First, the enhanced transmission MAC processing unit 45 of the media-access control unit 13 determines the amount of transmission data (or the transmission rate) so that it does not exceed specified limits determined by the newest available maximum transmission rate updated according to the flow of FIG. 26A in consideration of the maximum transmission power (Max power) of the mobile station 1, and so on, and outputs yet-to-be-transmitted data, as E-DCH data, to the enhanced DCH transmit buffer 46.

At this time, the enhanced transmission MAC processing unit 45 outputs yet-to-be-transmitted data as long as there is yet-to-be-transmitted data in the buffers while it carries out control of the output timing autonomously.

There can be provided various types of methods of controlling the output timing including: (1) a method of giving a higher priority to E-DCH data; (2) a method of giving a higher priority to DCH data; and (3) a method of giving a higher priority to data having a larger amount of data. Which one of such various types of methods is adopted depends on how the mobile station 1 is implemented.

On the other hand, data associated with the logical channel (DCCH) for control is stored, as DCH data, in the transmit DCH buffer 44, and is further outputted from the transmit DCH buffer 44 to the multiplexing unit 54 of the physical layer control unit 14.

The multiplexing unit 54 of the physical layer control unit 14 multiplexes the E-DCH data outputted from the enhanced DCH transmit buffer 46, and the DCH data outputted from the transmit DCH buffer 44 onto the uplink DPDCH using a known technique.

The modulating unit 55 of the physical layer control unit 14 modulates the data associated with the uplink DPDCH which are obtained by the multiplexing unit 54 using a known technique, and outputs them to the transmitting unit 56 as a transmission baseband signal.

The transmitting unit 56 of the physical layer control unit 14 converts the transmission baseband signal outputted from the modulating unit 55 into a radio frequency signal using a known technique, and transmits the radio frequency signal to the base station 2 by way of the antenna 15.

Since an operation of the base station 2 in step ST105 is the same as that of step ST5 of FIG. 11, the explanation of the operation of the base station 2 will be omitted hereafter.

The base station 2 then notifies a result (ACK/NACK) of determination of reception of the E-DCH data to the mobile station 1 using the downlink E-DPCCH (in step ST106).

Since the operation of the base station 2 and mobile station 1 in step ST106 is the same as that of step ST6 of FIG. 11, the explanation of the operation of the base station 2 and mobile station 1 will be omitted hereafter.

In the above-mentioned way, the monitoring of the amounts of data of the transmit buffers of the mobile station 1 in the enhanced transmission MAC processing unit 45, the transmission of data from the mobile station 1 to the base station 2 at a transmission rate which does not exceed the available maximum transmission rate notified to the mobile station, and the notification of the reception determination result from the base station 2 are repeatedly carried out (in steps ST105 to ST106).

Next, a setting of intervals at which the amount-of-data information is transmitted from the mobile station 1 to the base station 2 will be explained.

Figure 27:
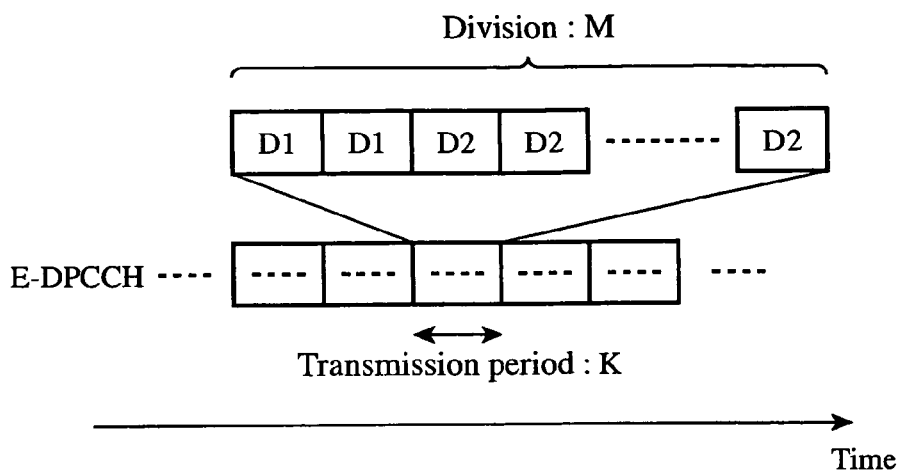
FIG. 27 is an explanatory diagram showing a transmission timing in a case when information indicating a request for assignment of radio resources for uplink is transmitted.
Figure 28:
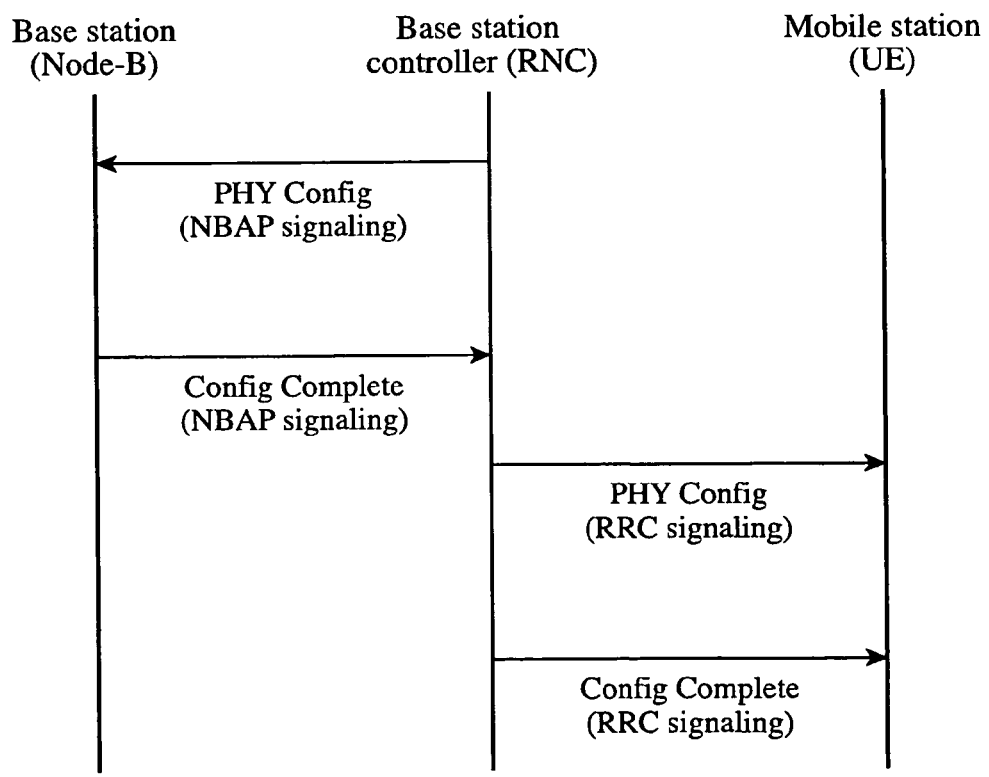
FIG. 28 is a flow figure showing an exchange of information among the mobile station, base station, and base station controller when transmission parameters used for transmission are set.

FIG. 27 is an explanatory diagram showing a transmission timing in a case when information indicating a request for assignment of the radio resources for uplink is transmitted, and FIG. 28 is a flow diagram showing an exchange of information among the mobile station 1, base station 2, and base station controller 3 when transmission parameters used for transmission are set.

In FIG. 27, two pieces of amount-of-data information (D1 and D2) respectively corresponding to the two communication services are transmitted using the E-DPCCH. The transmission of them is performed at predetermined intervals (K) and each interval (K) is divided into M sections.

One of the communication service 1 and communication service 2, which gets a higher priority in transmission or requires a higher level of QoS, or which has a larger change in the amount of data, uses a larger number of sections among the M divided sections.

As a result, the transmission of the amount-of-data information can be carried out at a high frequency. Therefore, the control of the transmission by the mobile station can be carried out by the base station 2 more efficiently and the throughput of the whole cell can be improved.

In accordance with this embodiment 9, the mobile station 1 transmits information which can be converted directly into interference power ($\propto$ mobile station transmission power) which is caused at a transmission rate required to transmit data to the base station 2, instead of the amount-of-data information, when making a request of the base station for assignment of the radio resources. Therefore, the amount of calculations of the scheduler 116 can be reduced, and hence the structure of the scheduler 116 can be simplified.

Furthermore, the base station 2 transmits information which can be converted directly into interference power (xc mobile station transmission power) which is caused at a transmission rate required to transmit data to the mobile station 1, instead of the amount-of-data information, when notifying a scheduling result to the mobile station. Therefore, the amount of calculations of the enhanced transmission MAC processing unit 45 of the mobile station 1 can be reduced, and hence the structure of the mobile station 1 can be simplified.

In addition, in accordance with this embodiment 9, since the radio resource assignment request cycle and the data transmission cycle are separated from each other, it is not necessary to carry out scheduling for the data transmission timing, and therefore the structure of the scheduler 116 can be simplified.

Only a request for permission to increase or decrease the transmission rate is transmitted, as information which is transmitted when a request for assignment of the radio resources is made, from the mobile station 1 to the base station 2. Alternatively, it is possible to add the transmission power margin (Power margin) information about the mobile station 1 to the request, and to transmit the request with the transmission power margin information to the base station, as in the case of above-mentioned embodiment 1.

There can be provided various methods of setting a reference for the length of the intervals at which the amount-of-data information is transmitted, which is explained with reference to FIG. 27, including: (1) a method of transmitting the two pieces of amount-of-data information while there is yet-to-be-transmitted data; and (2) a method of transmitting the two pieces of amount-of-data information every time when yet-to-be-transmitted data appears or disappears. The method of setting a reference for the length of the intervals at which the amount-of-data information is transmitted is not limited to any one of the examples of this embodiment 9.

The specifications of the information transmission intervals and the method of setting the intervals at which the amount-of-data information is transmitted which are explained with reference to FIG. 27 can be also used in any of above-mentioned embodiments 1 to 8.

All the above-mentioned pieces of amount-of-data information or the radio resource assignment request information can be shown by an index indicating specific information. In addition, the base station 2 can assign radio resources on the basis of the index received from the mobile station 1.

Needless to say, the mobile station 1 can be a terminal which is used while being fixed at a specific location.

INDUSTRIAL APPLICABILITY

As mentioned above, the mobile station in accordance with the present invention is suitable for use in a communication system in which a base station can properly control the transmission timing of data which are stored on a communication-service-by-communication-service basis or on a transmit-channel-by-transmit-channel and there is a need to efficiently provide a plurality of communication services which comply with the W-CDMA standard.

The invention claimed is:

1. A mobile station comprising:
    a transmit buffer for storing data about a plurality of communication services on a communication-service-by-communication-service basis or on a transmit-channel-by-transmit-channel basis;
    an amount-of-data information determining unit that monitors the data which are stored in said transmit buffer on a communication-service-by-communication-service basis or on a transmit-channel-by-transmit-channel basis to determine at least one value indicating an amount-of-data stored on a communication-service-by-communication-service basis or transmit-channel-by-transmit-channel basis; and
    a transmitting unit that transmits the at least one value indicating the amount-of-data stored on the communication-service-by-communication-service basis or transmit-channel-by-transmit-channel basis determined by said amount-of-data information determining unit to a base station.

2. The mobile station according to claim 1, the mobile station further comprising:
    a second transmit buffer storing control information corresponding to the first transmit buffer,
    wherein the amount-of-data information determining unit further monitors the control information stored in the second transmit buffer and the at least one value further indicates an amount of the control information stored in the second transmit buffer.

3. The mobile station according to claim 2, wherein the control information includes information about a total memory size of all of the first and second transmit buffers.

4. A base station comprising:
    a receiving unit that receives, from a mobile station, at least one value indicating an amount of data stored in a transmit buffer of the mobile station on a communication-service-by-communication-service basis or transmit-channel-by-transmit-channel basis, wherein the mobile station determines the at least one value by monitoring the amount of data stored in the transmit buffer;
    an assignment determining unit that determines assignment of radio resources for data to be transmitted from said mobile station according to the at least one value indicating the amount of data stored in the transmit buffer of the mobile station on the communication-service-by-communication-service basis or transmit-channel-by-transmit-channel basis received by said receiving unit; and
    a notifying unit that notifies transmission control information indicating the assignment of radio resources determined by said assignment determining unit to said mobile station.

5. A communication system provided with a base station which notifies transmission control information indicating radio resources, and a mobile station which transmits data to said base station according to the transmission control information notified from said base station,
    said mobile station comprising:
    a transmit buffer for storing data about a plurality of communication services on a communication-service-by-communication-service basis or on a transmit-channel-by-transmit-channel basis;
    an amount-of-data information determining unit that monitors the data which are stored in said transmit buffer on a communication-service-by-communication-service basis or on a transmit-channel-by-transmit-channel basis to determine at least one value indicating an amount-of-data stored on a communication-service-by-communication-service basis or transmit-channel-by-transmit-channel basis; and
    a transmitting unit that transmits the at least one value indicating the amount-of-data stored on the communication-service-by-communication-service basis or transmit-channel-by-transmit-channel basis determined by said amount-of-data information determining unit to said base station,
    and said base station comprising:
    a scheduler for assigning radio resources used for carrying out data transmission to said mobile station according to the at least one value indicating the amount-of-data stored received from said mobile station.

6. An amount-of-data information transmission method comprising:
    monitoring data to be transmitted from a terminal on a communication-service-by-communication-service basis or on a transmit-channel-by-transmit-channel basis;
    determining at least one value indicating an amount-of-data stored on a communication-service-by-communication-service basis or on a transmit-channel-by-transmit-channel basis; and
    transmitting the at least one value indicating the amount-of-data stored which is determined on a communication-service-by-communication-service basis or on a transmit-channel-by-transmit-channel basis to a base station.

7. A transmission-control-information notification method comprising:
    when a base station receives, from a mobile station, at least one value indicating an amount-of-data stored in a transmit buffer of the mobile station which is determined on a communication-service-by-communication-service basis or on a transmit-channel-by-transmit-channel basis, determining radio resources for data to be transmitted from said mobile station according to the at least one value indicating the amount-of-data stored, wherein the mobile station determines the at least one value by monitoring the amount of data stored in the transmit buffer; and
    notifying transmission control information indicating the radio resources to said mobile station.

8. A wireless communication method comprising:
    when data about a plurality of communication services are stored in transmit buffers on a communication-service-by-communication-service basis or on a transmit-channel-by-transmit-channel basis, monitoring the data which are stored in the transmit buffers on a communication-service-by-communication-service basis or on a transmit-channel-by-transmit-channel basis;

determining at least one value indicating an amount of data stored on a communication-service-by-communication-service basis or on a transmit-channel-by-transmit-channel basis;

transmitting the at least one value indicating the amount-of-data stored which is determined on a communication-service-by-communication-service basis or on a transmit-channel-by-transmit-channel basis to a base station;

when the base station receives the at least one value indicating the amount-of-data stored which is determined on a communication-service-by-communication-service basis or on a transmit-channel-by-transmit-channel basis from a mobile station, determining radio resources for data to be transmitted from said mobile station according to the at least one value indicating the amount-of-data stored;

notifying transmission control information indicating the radio resources to said mobile station; and said mobile station transmitting the data to said base station according to the transmission control information notified from said base station.

9. A mobile station comprising:

a transmit buffer for storing data about a plurality of communication services on a communication-service-by-communication-service basis or on a transmit-channel-by-transmit-channel basis;

an amount-of-data information determining unit that monitors the data which are stored in said transmit buffer on a communication-service-by-communication-service basis or on a transmit-channel-by-transmit-channel basis to determine at least one value indicating an amount-of-data stored on a communication-service-by-communication-service basis or transmit-channel-by-transmit-channel basis;

a converting unit that converts the at least one value indicating an amount-of-data stored on a communication-service-by-communication-service basis or transmit-channel-by-transmit-channel basis into a different form; and a transmitting unit that transmits the at least one value indicating the amount-of-data stored on the communication-service-by-communication-service basis or transmit-channel-by-transmit-channel basis converted by the converting unit to a base station.

10. The mobile station according to claim 9, wherein said converting unit converts the at least one value indicating the amount-of-data stored on the communication-service-by-communication-service basis or transmit-channel-by-transmit-channel basis into a binary digit number, and outputs the binary digit number to the transmitting unit.

11. The mobile station according to claim 9, wherein said converting unit converts the at least one value indicating the amount-of-data stored on the communication-service-by-communication-service basis or transmit-channel-by-transmit-channel basis into a data occupation ratio of the transmit buffer, and outputs the data occupation ratio to the transmitting unit.

12. The mobile station according to claim 9, wherein said converting unit converts the at least one value indicating the amount-of-data stored on the communication-service-by-communication-service basis or transmit-channel-by-transmit-channel basis into a time, and outputs the time to the transmitting unit.

13. The mobile station according to claim 9, wherein said converting unit converts the at least one value indicating the amount-of-data stored on the communication-service-by-communication-service basis or transmit-channel-by-transmit-channel basis into a transmission rate, and outputs the transmission rate to the transmitting unit.

14. The mobile station according to claim 13, wherein said converting unit converts the at least one value indicating the amount-of-data stored on the communication-service-by-communication-service basis or transmit-channel-by-transmit-channel basis into a number of bits per second or a number of bits per unit time as said transmission rate.

15. The mobile station according to claim 9, wherein said converting unit converts the at least one value indicating the amount-of-data stored on the communication-service-by-communication-service basis or transmit-channel-by-transmit-channel basis into a channel amplitude coefficient or a channel amplitude coefficient ratio, and outputs the channel amplitude coefficient or the channel amplitude coefficient ratio to the transmitting unit.

16. The mobile station according to claim 9, wherein said converting unit converts the at least one value indicating the amount-of-data stored on the communication-service-by-communication-service basis or transmit-channel-by-transmit-channel basis into a power dimension or a power dimension ratio, and outputs the power dimension or the power dimension ratio to the transmitting unit.

17. The mobile station according to claim 9, wherein said converting unit outputs an index indicating a combination of pieces of communication-service-by-communication-service or transmit-channel-by-transmit-channel amount-of-data information to the transmitting unit.

* * * * *